United States Patent
Hawkins

(10) Patent No.: US 9,740,884 B2
(45) Date of Patent: Aug. 22, 2017

(54) METHOD AND DEVICE FOR GENERATING A CODE

(71) Applicant: Good Technology Holdings Limited, Waterloo (CA)

(72) Inventor: Siavash James Joorabchian Hawkins, London (GB)

(73) Assignee: Good Technology Holdings Limited, Waterloo, Ontario (CA)

( * ) Notice: Subject to any disclaimer, the term of this patent is extended or adjusted under 35 U.S.C. 154(b) by 123 days.

(21) Appl. No.: 13/838,446

(22) Filed: Mar. 15, 2013

(65) Prior Publication Data

US 2013/0268775 A1    Oct. 10, 2013

Related U.S. Application Data

(60) Provisional application No. 61/622,168, filed on Apr. 10, 2012.

(51) Int. Cl.
| | |
|---|---|
| G06F 21/64 | (2013.01) |
| H04L 9/08 | (2006.01) |
| G06F 21/36 | (2013.01) |
| G06F 21/60 | (2013.01) |

(52) U.S. Cl.
CPC .............. *G06F 21/64* (2013.01); *G06F 21/36* (2013.01); *G06F 21/602* (2013.01); *H04L 9/0872* (2013.01)

(58) Field of Classification Search
CPC .............. G06F 15/167; G06F 17/30073; G06F 17/30766; G06F 2221/2107; G06F 2221/2113; G06F 21/6218; G06F 2221/0797; G06F 11/1675; G06F 21/64; G06F 21/36; G06F 21/72; G06F 21/10; G06F 21/602; H04L 9/0872
USPC ........................ 726/4, 21; 713/189
See application file for complete search history.

(56) References Cited

U.S. PATENT DOCUMENTS

| | | | |
|---|---|---|---|
| 5,559,961 A | 9/1996 | Blonder | |
| 6,895,514 B1 * | 5/2005 | Kermani | G06F 21/316 726/19 |
| 7,844,825 B1 * | 11/2010 | Neginsky | G06F 21/83 713/184 |
| 8,024,775 B2 | 9/2011 | Xu et al. | |
| 8,112,813 B1 * | 2/2012 | Goodwin | G06F 21/10 726/27 |

(Continued)

OTHER PUBLICATIONS

Susan Wiedenbeck, et al., "Authentication Using Graphical Passwords: Basic Results", Proc. Human-Computer Interaction International, 2005, 10 pages.

(Continued)

*Primary Examiner* — Michael Pyzocha
(74) *Attorney, Agent, or Firm* — Fish & Richardson P.C.

(57) ABSTRACT

Methods and devices arranged to provide functions for generating a security code are described. These functions include defining a set of locations in the one or more images on the basis of one or more user-selected locations, and generating a security code based on values determined and derived from display parameters associated with imaging elements having locations corresponding to the defined set of locations. This enables a security code to be generated that contains a high level of entropy, and is therefore capable of providing high levels of security, based on user input that is easy for the user to remember.

42 Claims, 12 Drawing Sheets

(56) References Cited

U.S. PATENT DOCUMENTS

| | | | |
|---|---|---|---|
| 8,381,274 B2 | 2/2013 | Wang | |
| 8,458,485 B2* | 6/2013 | Bandyopadhyay | G06F 21/316 713/184 |
| 8,650,636 B2* | 2/2014 | Johnson | H04L 9/3226 705/51 |
| 8,782,775 B2* | 7/2014 | Fadell | G06F 21/316 726/16 |
| 8,832,810 B2* | 9/2014 | Cheswick | G01S 19/14 713/182 |
| 9,652,814 B2* | 5/2017 | Adam | G06T 1/005 |
| 2002/0029341 A1* | 3/2002 | Juels | G06F 21/36 713/184 |
| 2004/0085351 A1 | 5/2004 | Tokkonen | |
| 2004/0230843 A1* | 11/2004 | Jansen | 713/202 |
| 2006/0288226 A1* | 12/2006 | Kowal | G06F 21/36 713/182 |
| 2008/0028205 A1* | 1/2008 | Yang | 713/156 |
| 2009/0085936 A1* | 4/2009 | Chen | G06F 3/0481 345/661 |
| 2009/0119221 A1* | 5/2009 | Weston | G06Q 20/382 705/76 |
| 2009/0262928 A1* | 10/2009 | Busari | G06F 7/588 380/46 |
| 2009/0293119 A1* | 11/2009 | Jonsson | G06F 21/36 726/19 |
| 2010/0007669 A1* | 1/2010 | Bethune | G06T 3/40 345/520 |
| 2010/0287382 A1 | 11/2010 | Gyorffy | |
| 2010/0316217 A1* | 12/2010 | Gammel et al. | 380/44 |
| 2010/0328240 A1* | 12/2010 | Matsubara | G06F 3/044 345/173 |
| 2011/0004652 A1* | 1/2011 | Long | G06Q 10/10 709/203 |
| 2011/0191592 A1* | 8/2011 | Goertzen | 713/182 |
| 2012/0011575 A1* | 1/2012 | Cheswick | G01S 19/14 726/5 |
| 2012/0159615 A1* | 6/2012 | Griffin | H04L 9/3226 726/19 |
| 2012/0159616 A1* | 6/2012 | Griffin | G06F 21/36 726/19 |
| 2013/0097673 A1* | 4/2013 | Meehan | G06Q 20/341 726/4 |

OTHER PUBLICATIONS

Susan Wiedenbeck, et al., "Authentication Using Graphical Passwords: Effects of Tolerance and Image Choice", Proceedings of the 2005 Symposium on Usable Privacy and Security, ACM, 2005, 12 pages.

Susan Wiedenbeck, et al., "PassPoints: Design and longitudinal evaluation of a graphical password system", International Journal of Human-Computer Studies, vol. 63, 2005, pp. 102-127.

Jean-Camille Birget, et al., "Robust discretization, with an application to graphical passwords", Cryptology Eprint Archive, Report 2003/168, http://eprint.iacr.org/, 2003, pp. 1-10.

Fabian Monrose, et al., "Graphical Passwords", Chapter 9, 10346, Aug. 5, 2005, pp. 161-180.

Xiaoyuan Suo, et al., "Graphical Passwords: A Survey", IEEE 21st Annual Computer Security Applications Conference, 2005, 10 pages.

Ian Jermyn, et al., "The Design and Analysis of Graphical Passwords", Proceedings of the 8th USENIX Security Symposium, 1999, 14 pages.

Hai Tao: "Pass-Go, a New Graphical Password Scheme" Thesis Jun. 30, 2006, XP055037739.

International Search Report and Written Opinion PCT/EP2013/057502 dated Sep. 5, 2013.

* cited by examiner

| Coordinates | RGB Color Value |
|---|---|
| 21,12 | 185 176 173 |
| 21,13 | 114 118 111 |
| 21,14 | 140 134 125 |
| 21,15 | 138 124 118 |
| 21,16 | 144 134 127 |
| 22,16 | 107 81 81 |
| 23,16 | 107 82 81 |
| 24,16 | 92 69 70 |
| 25,16 | 90 69 67 |
| 26,16 | 95 70 72 |
| 27,16 | 99 77 76 |
| 28,16 | 112 87 87 |
| 29,16 | 136 111 100 |
| 28,15 | 109 85 81 |
| 28,14 | 190 171 167 |
| 27,13 | 163 139 131 |
| 26,12 | 162 145 137 |
| 25,12 | 156 135 125 |
| 24,12 | 165 147 139 |
| 23,12 | 174 155 150 |
| 22,12 | 176 163 159 |
| 21,12 | 185 176 173 |
| 30,4 | 175 149 129 |
| 36,4 | 161 136 113 |
| 39,4 | 139 107 92 |

S606 Concatenate stored values 2112185176173211311411811121141401341252
1151381241182116144134127221610781812316
1078281241692697025169069967335742616957O
7227169977762816112878729161361111002815
1098581281419017116727131631391312612162
1451372515613512524121651471392312174I
5515022121761631592112185176173041751 49
12936416113611133941391O792

FIG. 7

METHOD AND DEVICE FOR GENERATING A CODE

CROSS-REFERENCE TO RELATED APPLICATIONS

This application claims the benefit of priority under 35 U.S.C. §119(e) from U.S. Provisional Application No. 61/622,168 entitled "Method and Device for Generating a Code," and filed Apr. 10, 2012, the entire contents of which are incorporated herein by reference.

TECHNICAL FIELD

The present invention relates to a method and device for generating a security code and in particular, but not exclusively, for generating a security code for accessing data.

BACKGROUND

Data stored in storage media in computing devices is commonly protected by a password or security code to prevent unauthorized access of the data. For applications where high levels of security are required, data may be stored in an encrypted form so that it cannot be read by an unauthorized user who gains access to it.

Encryption algorithms transform unencrypted plaintext information into encrypted data using an encryption key. Once encrypted, the data is unreadable to anyone except those who possess, or are able to generate, the encryption key. Encryption algorithms use the encryption key to transform encrypted data into a readable form that can be displayed to the user.

The encryption key is a security code comprising a string of bits that is input to the encryption algorithm with data to transform the data to/from encrypted form. It is desirable that the string of bits be long enough to provide a sufficient level of unpredictability, or entropy, such that an unauthorized user cannot guess or otherwise break the key by, for example, trying different possible combinations of bits, and decrypt the data.

Typically, users are not required to input the encryption key directly, since in secure systems the string of data is too long to be easily remembered or input. More commonly, the user enters a password that is known only to authorized users, and which is converted using a mathematical transformation such as a hash function into a security code. The security code may then be used as the encryption key, or may be used as a seed for the encryption key, to encrypt or decrypt data.

Most commonly, passwords used for these purposes are alphanumeric. To improve security, these alphanumeric passwords may be generated as one time pass codes (OTPs), for example by providing the user with a "tag" or other device containing logic for generating a time and/or event related code. Alternatively, the password may be simply a word or alphanumeric string that the user remembers. In either case, a balance is required between the level of password complexity needed to provide enough entropy to ensure the encrypted data is secure, and the need for the password to be relatively easy to remember and/or enter into the computing device to decrypt the relevant data.

Achieving an appropriate balance between password complexity and ease of use is particularly difficult in systems where users are able to choose a password. It is well known that users tend to favor short, easy to remember, and easy to enter, passwords. Unfortunately, passwords that fall into this category are also the easiest to guess, break, or otherwise breach, since they contain low levels of entropy and are therefore less secure.

Methods in which a user enters a "graphical password" by drawing a continuous line grid are known. The coordinates of the cells of the grid through which the line passes are used to define a password. Although such methods may enable passwords to be more easily remembered, they are not capable of generating security codes with high levels of entropy, because of the number of cells in the grids used is, in practice, relatively limited.

It is an object of the present invention to at least mitigate some of the problems of the prior art.

SUMMARY

In accordance with a first aspect of the present invention, there is provided a method of generating a code for accessing data, the method comprising:

displaying one or more images on a display, the display comprising an array of imaging elements for displaying images, each said imaging element having a predefined location on the display and being controllable according to an associated set of display parameters defining one or more display characteristics of the imaging element, whereby characteristics of a displayed image can be varied by varying values of the display parameters associated with the imaging elements;

receiving user input to select one or more locations within said one or more images;

defining a set of locations in said one or more images on the basis of the selected one or more locations;

determining values of display parameters associated with the defined set of locations; and generating a security code on the basis of the determined values.

By defining a set of locations in the one or more images on the basis of the selected one or more locations, and generating a security code based on values determined and derived from display parameters associated with imaging elements having locations corresponding to the defined set of locations, a security code can be generated based on user input that is easy for the user to remember, but which has a high level of entropy, and is therefore capable of providing a high level of security.

In some embodiments, the defined set of locations comprises an area of said image.

In some embodiments, the method comprises using one or more reference points in combination with the selected one or more locations to define said area. The one or more reference points may be located at an edge and/or a corner of the image. Using reference points in combination with the selected one or more locations defined by user input enables generation of a security code with a high level of entropy despite the user input being relatively simple. This reduces the complexity of user input that the user must remember and accurately enter, while still enabling a relatively secure security code to be generated.

In some embodiments, the user input comprises user input to select locations at the perimeter of said area. The user input may comprise user input to select a continuous sequence of points enclosing said area. This enables relatively large amounts of raw data to be available for generating a security code even when the user input is relatively simple.

In some embodiments, the defined set of locations comprises said selected one or more locations. The user input may comprise user input to select a sequence of adjacent locations, and/or may comprise a plurality of user input actions to select non-adjacent locations in said one or more images.

In some embodiments, the one or more images are represented in one or more image files, and the step of determining values of display parameters comprises deriving said display parameters from the one or more image files.

In some embodiments, the method comprises deriving locations within the one or more images on the basis of locations of the display selected by a user.

In some embodiments, the method comprises transforming the locations on the display selected by the user in accordance with a map linking locations on the display with locations within said one or more images.

In some embodiments, each said displayed image comprises a predefined array of discrete selectable locations, each said selectable location being selectable according to user input corresponding to a predefined area of a displayed image, each said predefined area including a plurality of said imaging elements.

In some embodiments, the method comprises displaying a plurality of said images in a sequence, a first image of the sequence being replaced by a second image of the sequence, the second image being different from the first image. A sequence of display images, provides a larger amount of data from which to generate the security code, and therefore enables generation of more secure codes.

In some embodiments, the one or more images are provided by the user. This enables the user to select images which contain features that are easily remembered and recognized by that user.

In some embodiments, the method comprises determining a first complexity value of the one or more images on the basis of the sets of parameters associated with the array of imaging elements. This ensures that images selected by the user contain enough variation that security codes generated on the basis of those images contain enough entropy, so that an administrator can maintain a required degree of security for data that users access.

In some embodiments, the first complexity value is determined based on a statistical variation of the one or more display parameters. In some embodiments, the method comprises requiring the user to provide a different image if the first complexity value of the one or more images is below a threshold complexity value.

In some embodiments, the one or more images comprise one or more photographs. Photographs typically contain high degrees of color variation, and therefore a high degree of variation in the data that can be used for generating a secure code without a corresponding increase in the complexity of the required user input.

In some embodiments, the one or more images are selected by the user from a gallery of images. This obviates the need for the user to provide an image with the required degree of complexity. In addition, requiring the user to select the correct image from a gallery of images enables an additional layer of security.

In some embodiments, the method comprises determining a second complexity value on the basis of the received user input. The method may comprise requiring the user to enter a different user input if the second complexity value is below a threshold complexity value. This ensures that the security code generated by the method is less vulnerable to so-called "shoulder-surfing" attacks in which a user is observed entering user inputs, and mitigates the risk of an unauthorized user guessing the correct set of user inputs.

In some embodiments, the method comprises using the security code to generate an encryption key that may be used to decrypt stored data to be displayed on said display or on a further, different, display. In some embodiments, the method comprises using the encryption key to decrypt and/or encrypt data stored on a remote computing device. In some embodiments, the method comprises using the security code to generate a first encryption key and using the first encryption key to encrypt and/or decrypt a second encryption key different from the first encryption key. The second encryption key may be used to decrypt and/or encrypt stored data.

In some embodiments, the determined values comprise color values associated with the defined set of locations. The color values may comprise at least one of a red value, a green value and a blue value. In other embodiments, the color values comprise at least one of a hue value, an intensity value and a saturation value, or at least one of a cyan value, a magenta value, a yellow value and a black value. In some embodiments, the color values associated with the imaging elements are extracted from a color palette.

In some embodiments, the method comprises generating the security code at least partly on the basis of one or more coordinate values associated with the defined set of locations.

In some embodiments, the method comprises determining the timing of each user input and generating the security code at least partly on the basis of said timing. In other embodiments, the display comprises a touch-screen display and said user input comprises touch-screen user input. In yet other embodiments, the method comprises determining a pressure applied to the touch-screen display when receiving touch-screen user input, and generating the security code at least partly on the basis of the determined pressure. Each of these other embodiments enables generation of even more secure codes without any increase in the complexity of the required user input.

In some embodiments, the display comprises a 3D display and the method comprises receiving user input to select one or more locations within a displayed 3D image.

In accordance with a second aspect of the present invention, there is provided a computing device configured to:

display one or more images on a display, the display comprising an array of imaging elements for displaying images, each said imaging element having a predefined location on the display and being controllable according to an associated set of display parameters defining one or more display characteristics of the imaging element, whereby characteristics of a displayed image can be varied by varying values of the display parameters associated with the imaging elements;

receive user input to select one or more locations within said one or more images;

define a set of locations of said one or more images on the basis of the selected one or more locations;

determine values of display parameters associated the defined set of locations; and generate a security code on the basis of the determined values.

The computing device of the second aspect may be adapted to provide features corresponding to any of those of the first aspect.

In some embodiments, the computing device includes the display. In some embodiments, the display comprises a touch-screen display. In some embodiments, the computing device is a portable device such as a smart phone.

In accordance with a third aspect of the present invention, there is provided a non-transitory computer readable medium having computer-executable instructions stored thereon which, when executed by a computing device will cause the computing device to:

display one or more images on a display, the display comprising an array of imaging elements for displaying images, each said imaging element having a predefined location on the display and being controllable according to an associated set of display parameters defining one or more display characteristics of the imaging element, whereby characteristics of a displayed image can be varied by varying values of the display parameters associated with the imaging elements;

receive user input to select one or more locations within said one or more images;

define a set of locations of said one or more images on the basis of the selected one or more locations;

determine values of display parameters associated with the defined set of locations; and generate a security code on the basis of the determined values.

The computer readable medium of the third aspect may be adapted to provide features corresponding to any of those of the first and second aspects.

Further features and advantages of the invention will become apparent from the following description of preferred embodiments, given by way of example only, which is made with reference to the accompanying drawings.

BRIEF DESCRIPTION OF THE DRAWINGS

FIG. 7 is a graphical representation of a memory store illustrating its use in generating a security code in accordance with the first embodiment;

DETAILED DESCRIPTION

Figure 1A:
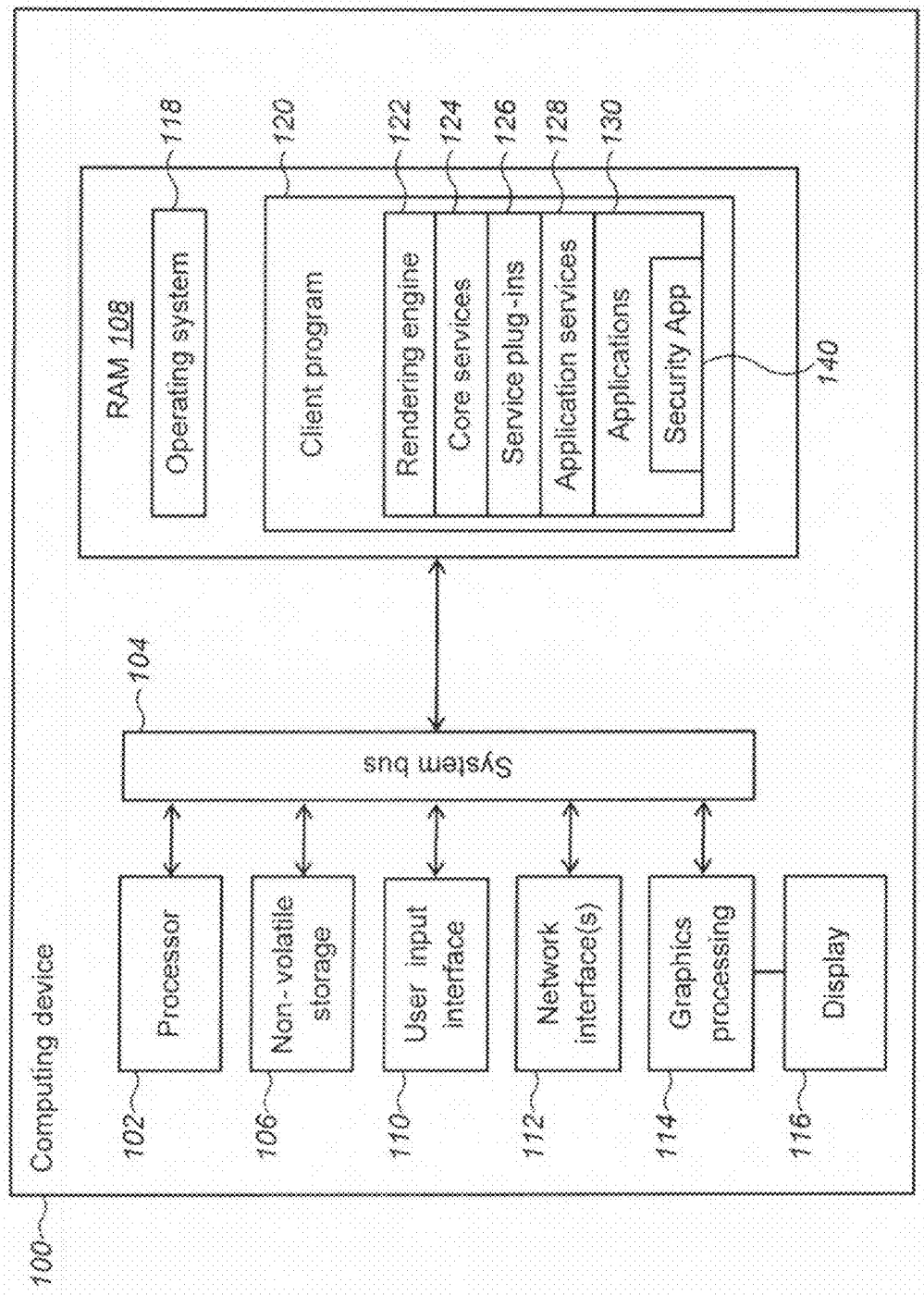
FIG. 1a is a schematic diagram illustrating the components of a computing device in accordance with an embodiment.

FIG. 1a schematically illustrates the components of a computing device 100, which is an exemplary device used to illustrate the features of the present invention. The computing device 100 may take the form of a Smartphone, a personal digital assistant (PDA), an e-reader, a tablet computer, desktop computer, laptop, or any other suitable device. The computing device 100 includes a processor 102 that is able to transmit control messages to, receive status information from, and transmit data to and from components within the computing device 100 that are connected to a system bus 104, where these components may include a non-volatile storage device 106, random access memory (RAM) 108, user input interface 110, network interface 112 and graphics-processing component 114. The processor 102, which in this embodiment is a microprocessor, processes instructions stored in the RAM 108 that have been loaded from the non-volatile storage device 106, which could be for example a flash memory or a hard disk drive. These instructions are in the form of computer software in the form of one or more programs that implement an operating system 118 and a client program 120. The RAM 108 is also used by programs running on the processor 102 as a means of storing and accessing data in the form of electronic signals where the data is used during the execution of the programs.

The computing device 100 includes a graphics-processing component 114 that is able to render graphics in accordance with commands made by programs running on the processor 102 and output these to a display 116, which may reside within the computing device 100. The display 116 may be an external component connected to the computing device 100 via one or more of composite video, component video, Video Graphics Array, Digital Visual Interface, and High-Definition Multimedia Interface connection. The display 116 may be an integral component of the computing device 100, and may be a touch-screen display.

Programs running on the processor 102 can process user input obtained from a user input interface 110 that receives user input from a user input device or devices (not shown). User input devices may include a keypad, keyboard, mouse and/or remote control, or any other pointer device, which may be incorporated within the computing device 100 or may be connected to it via a wired or wireless connection.

Figure 1B:
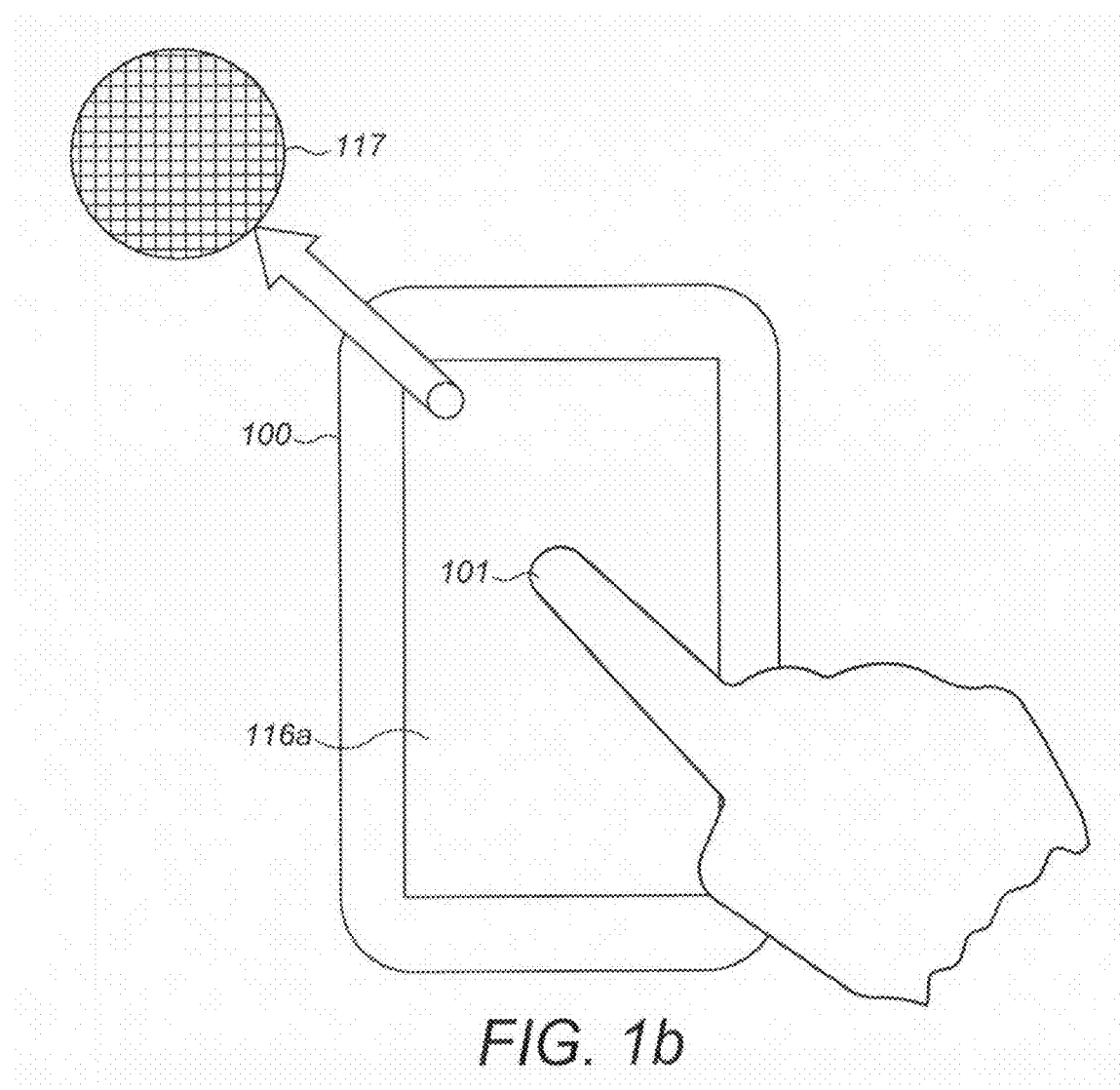
FIG. 1b is a pictorial diagram illustrating an exemplary embodiment of a computing device in accordance with an embodiment.

FIG. 1b shows an external view of an exemplary embodiment of a computing device 100. In this embodiment, the user input functions of the user input interface 110 are combined with the functions of the display 116 as a touch-screen display 116a. The touch-screen display 116a may be touched by a user using a finger 101 in order to provide touch-screen user input that is received by the user input interface 110 and then processed by one or more programs running on the processor 102. Alternatively a stylus or other device may be used to provide the touch input. The touch-screen interface of the touch-screen display 116a may use any of a number of different touch-sensing technologies including capacitive sensing technologies such as mutual capacitance or self capacitance, where a number of capacitive sensor elements detect touch input to the touch-screen interface.

The display 116 comprises an array of imaging elements 117 having discrete locations and that can be individually addressed with an electrical display signal to generate an image. The imaging elements 117 may also be selectable in the case of touch-screen displays, though not necessarily with the same resolution. In some embodiments, each imaging element 117 is further divided into sub-elements that can be individually addressed. The sub-elements may each be capable of emitting light of a different waveband, and therefore by applying display signals with different display parameters to each sub-element, the imaging element can emit different colors. Colors may be generated by one or more of selective emission, selective absorption, transmission and selective reflection, of the imaging element. As described above, the display 116 may be separate from the computing device 100, or may be integral to the computing device 100. The display type of the display 116 may include one or more of liquid crystal (LCD), light emitting diode (LED), organic light emitting diode (OLED), electroluminescent (ELD), thin film transistor (TFT), high-performance addressing (HPA), plasma (PDP), and E-ink displays, or any other suitable technology.

Data for generating images that can be displayed on the display 116 may be stored in non-volatile storage 106 in a range of formats. Image formats may include one or more of bitmap, JPEG, TIF, GIF, PNG and PDF formats. Alternatively, images may be stored in any other image format. In some embodiments, data for generating videos that can be displayed on the display 116 may also be stored in non-volatile storage 106. Video formats may include one or more of MPEG, AVI, windows media (WMF), blu-ray, DVD, or any other video format. The graphics processing component 114 may be capable of processing image and video files into a form that can be displayed on the display 116. In particular, the graphics-processing component 114 can store the image or video file data in the RAM 108, decode the image or video file to map data associated with image pixels to imaging elements 117 of the display 116, generate display signals based on pixel data in the image or video file, and provide the display signals to the respective mapped imaging elements or sub-elements in order to generate a color or intensity representative of the pixel data. The graphics-processing component may also be capable of decoding timing data to display images that make up a video sequence at an appropriate rate. The graphics-processing component 114 may generate a transformation map that is stored in RAM 108, and used to convert pixel locations as defined in the image or video file into the coordinates of imaging elements 117. The transformation map may be updated as the image or video is moved to different portions of the display 116.

In addition, the graphics-processing component 114 may include steps of upsampling the image data in order to increase the resolution of the image, and color space transformation, to translate color representations from one color system to another.

Representative color values may be stored or displayed as red, green and blue (RGB) values, cyan, magenta yellow and black (CYMK) values, luma (brightness) and chroma ($YC_BC_R$), or hue, saturation and intensity (HSI) values, for example. In some embodiments, data within the image file refers to index values of a color palette, and the graphics-processing component 114 generates signals to be sent to the imaging elements of the display on the basis of the values referenced in the palette. In some embodiments, the graphics-processing component generates signals to be sent to the imaging elements of the display based on a vector graphics model.

The operating system 118 is computer software in the form of a program or set of programs whose instructions are loaded from non-volatile storage 106 by the processor 102 and executed when the computing device 100 is turned on. The operating system 118 may start further programs automatically and/or may allow a user to start further programs, for example via a user interface provided by the operating system 118. The operating system 118 enables the sharing of the processing power provided by the processor 102 between the programs (e.g. 120) running on the processor 102.

The operating system 118 provides a programmatic interface for programs running on the processor 102 allowing them to request functionality from the operating system 118. This programmatic interface may take the form of procedures, i.e. system calls, which a program running on the processor 102 may use in order to invoke the operating system 118 and request it to provide desired functionality. In response to receiving a request for functionality, the operating system 118 may transmit control messages to, receive status information from, transmit data to and/or receive data from components (e.g. 106, 108, 110, 112, 114, 116) connected to the system bus 104 in order to provide the requested functionality, and may also return data to the requesting program as a result.

The operating system 118 may provide a file system for storing, modifying, and accessing files or other data held in non-volatile storage 106. The file system may be accessible to other programs running on the processor 102 via the programmatic interface provided by the operating system 118.

Figure 2:
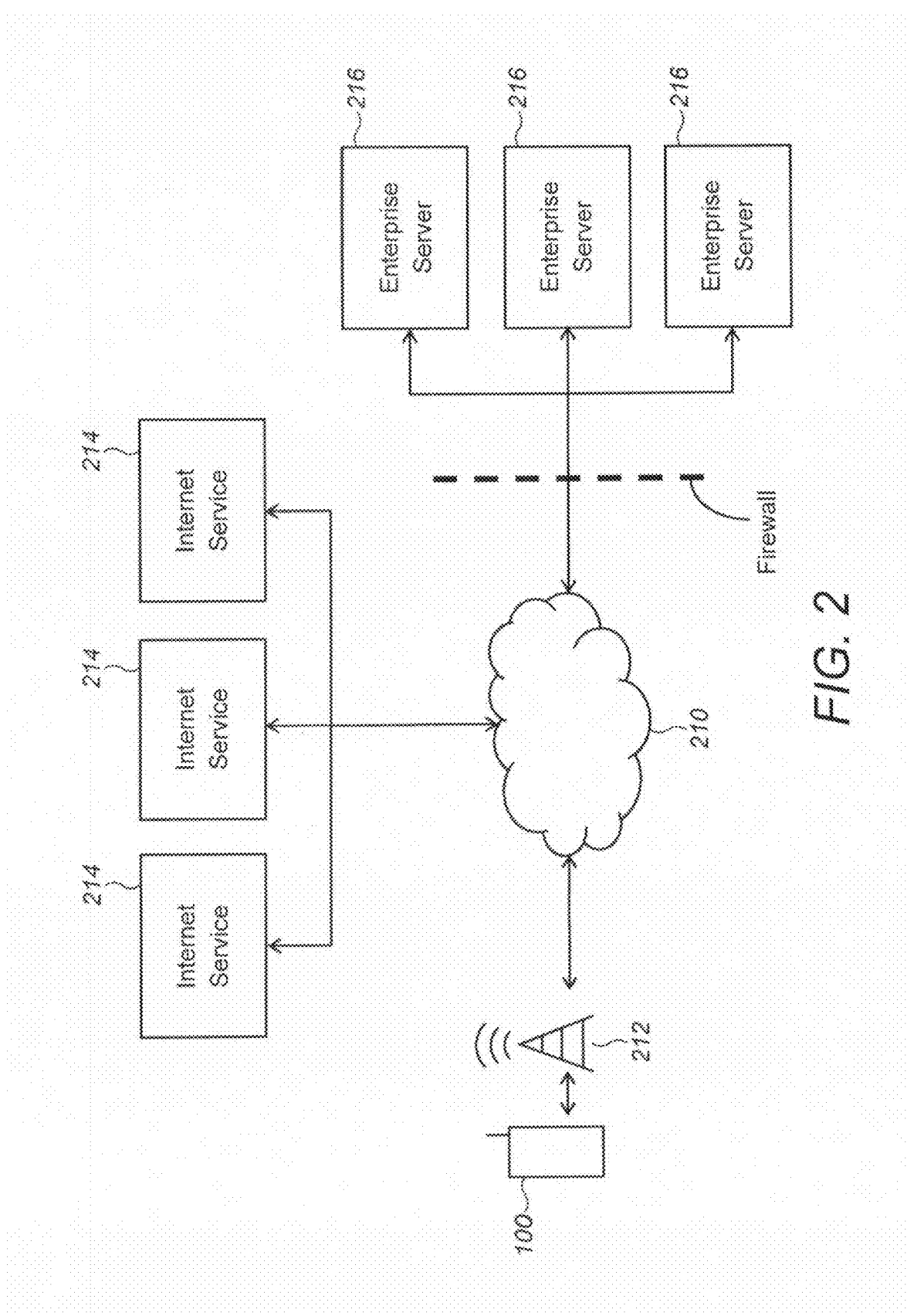
FIG. 2 is a schematic diagram of a system illustrating the communication links associated with a computing device in accordance with an embodiment.

The computing device 100 also includes a network interface 112 (or a plurality of such interfaces) that allows programs running on the processor 102 to transmit and receive data to and from a number of other devices and systems via a communications network 210 (or a plurality of such networks), as shown in FIG. 2. The network interface 112 (or plurality of such interfaces) may be able to connect to the communications network 210 via a wireless access node 212 using one or more of a number of radio access technologies or via a wired technology such as a modem and/or an Ethernet card. The communications network 210 and/or wireless access node 212 may also provide access to the Internet 214.

In order to access content and services provided by remote data processing devices such as one or more enterprise servers 216, a user of the computing device 100 may use a client program 120 on the computing device 100. The client program 120 may be pre-loaded onto the computing device 100 before purchase of the computing device 100 by the user. Alternatively the client program 120 may be downloaded and installed onto the computing device 100 by the user, for example by the user using an application store program provided by the operating system 118 to download (and install) the client program 120 from an application store server via the communications network 210.

The user may use the operating system 118 to start the client program 120 once it is installed on the computing device 100. The client program 120 may include a number of components that are configured to allow the user to access services provided by remote data processing devices such as the one or more enterprise servers 216. These components of the client program 120 may include a rendering engine 122, core services 124, service plug-ins 126, application services 128, and applications 130. These components may use the programmatic interface provided by the operating system 118 (i.e. system calls) to request functionality from the operating system 118 (for example to access the file system, send/receive messages, use the network interface 112, etc).

The applications 130 may include a security application 140 that provides a user interface allowing the user to enter identification and authentication details for accessing data stored in the non-volatile storage 106, or for remotely accessing data stored on the one or more enterprise servers 216. The security application 140 may display an authentication user interface which may be displayed when the user attempts to access secure (encrypted) data. The authentication user interface may also be the first user interface that is displayed to a user when the client program 120 is started, or when the device is first turned on, or at any other time when a conventional alphanumeric password or security code may be required. The security application 140 may also provide a user interface to the user that allows other applications 130 to be started and/or new applications 130 to be acquired from the one or more enterprise servers 216.

The security application 140 contains an algorithm for encrypting, and/or decrypting, data stored in the non-volatile storage 106. Encrypted data may be received via the one or more network interfaces 112 (for example, from the one or more enterprise servers 216) or may be saved to the non-volatile storage 106 by some other means. For example, data may be manually entered by the user, encrypted using the user's security code or an encryption key derived from the security code, and stored in encrypted form in the non-volatile storage 106.

In one embodiment, the data may be encrypted and/or decrypted according to a symmetric-key algorithm (i.e. using the same key for both encrypting and decrypting the data), such as the Advanced Encryption Standard (AES), or by any other suitable encryption standard. In order for encrypted data to be decrypted so that it is can be displayed in a readable form, an encryption key is provided, which the security application 140 uses in combination in the encryption algorithm to decrypt the data.

In some embodiments the security code is used to generate a first encryption key, which is used to decrypt a second key, stored in encrypted form in a container in the non-volatile storage 106 or on a remote device, such as an enterprise server 216. The decrypted second key may then be used to decrypt encrypted data that the user wishes to access. This is often done to enable secure transmission of encryption keys, and to avoid the need to re-encrypt the entire store of encrypted data when the security code is changed. Typically, the second key is randomly generated by the computer device 100, or by the enterprise server on which secure data is stored.

In some embodiments, the user is prompted to enter a series of inputs via the user input interface 110 (or where appropriate the touch-screen display 116a) to select a set of locations on the display 116, which correspond to a set of locations in the image. In order to aid the user in remembering and entering the inputs correctly, an image is displayed which the user is able to recognize, and which contains identifiable objects and/or features which the user can use as a frame of reference over which to enter the inputs. The image may be a photograph, or other graphic representation such as a corporate logo. Each of the inputs is for selecting a location within the one or more images that the user can recognize as distinct from other locations in the image. This enables the user to remember and enter the inputs more easily. The series of user inputs received by the computing device 100, form a 'graphical password' that the security application 140 may use to generate a security code.

Figure 3:
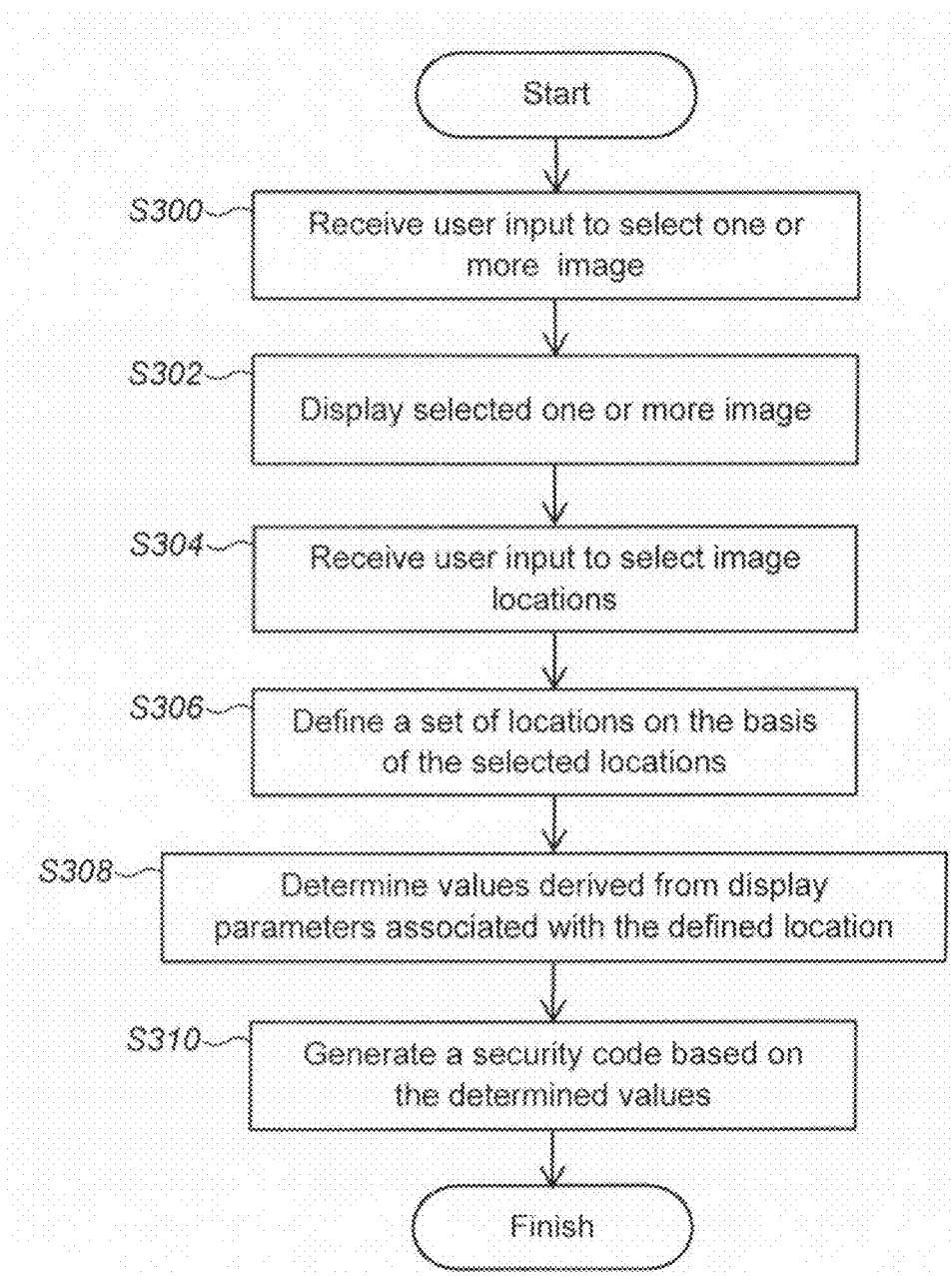
FIG. 3 is a flow diagram showing steps performed by a security application in generating a securing code in accordance with an embodiment.

FIG. 3 shows the steps performed by a security application 140 to generate a security code in an exemplary embodiment.

At step S300, the computing device 100 receives user input to select one or more images. The computing device 100 then displays the selected images on the display 116 at step S302. The image or images may occupy the whole of the display 116, or may only occupy a portion of the display 116. In some embodiments, the image or images may be displayed in a window environment that the user may be able to move within the display. In some embodiments, several images may be displayed in a timed sequence, or in a video sequence that appears to the user as a continuously moving scene.

At step S304, the computing device 100 receives user input to select one or more locations within the selected one or more images. The locations selected by the user input could be single points within the image, or could be lines or areas defined by the user input. This is described in more detail below.

In some embodiments, upon receiving user input, the user input interface 110 generates user input data that is stored in RAM 108. The user input data may include display coordinates at which the user input is received.

In embodiments where the user input device is a pointing device such as a mouse, display coordinate data may be generated continuously, and used by the operating system 118 to display a cursor on the display 116; in this case, the user input data may also include data representing user selection inputs indicating the display coordinates where the mouse button was clicked.

In embodiments where the user input is received by a touch-screen 216, the user input data may only be generated as the user enters user input.

The security application 140 may read the user input data from the RAM 108 to determine the display coordinates at which the user input was received. The security application 140 may then access the map generated by the graphics-processing component 114, and use the map to convert the user input display coordinates, representing the coordinates of selected imaging elements 117, into pixel locations as defined in the corresponding image file.

In embodiments where an image is displayed in only a portion of the display 116 and the position at which the image is displayed is changed, the graphics-processing component may update the map stored in RAM 108 so that the security application 140 can access an up-to-date map and define the same one or more locations within the image, for a given user input pattern received over a given image, regardless of where on the display 116 the image is presented to the user. This enables the security application 140, or indeed the user, to position the image or video anywhere on the display and still be able to enter the correct graphical password; this is particularly useful in operating systems that enable the user to customize a graphical user interface.

In embodiments where a sequence of images is displayed, the user input may select locations in each of the sequence of images. In embodiments where a video sequence of images is displayed, the user may define locations at different times during the video sequence.

At step S306, the security application 140 defines (i.e. determines) a set of locations to be used in generating a security code, based on the received user input. The defined set of locations may include location data corresponding to points selected by the user, as defined in the image file, or they may include transformations of the location data. Alternatively, the defined set of locations could include location data relating to the imaging elements, particularly in embodiments where the displayed image fills the display 116. Additionally, where points are defined by the user input, the security application 140 (or the computing device 100) may interpolate between the points to define a line as described below with reference to FIG. 9. Furthermore, where lines defined by the user input enclose an area, the locations within the enclosed area may also be included in the defined set of locations.

At step S308, the security application 140 determines values derived from display parameters associated with the defined set of locations defined at step S306. The display parameters may include color or intensity values or other display values associated with the display state of a given imaging element. The display parameters may be derived from values defined in the imaging or video file for the pixel or pixels that the imaging element or elements at that location are responsible for displaying. The values may be derived by transforming the display parameters, or performing a mathematical operation on the display parameters, or the display parameters could be used directly as the determined values. By determining values derived from the display parameters, the security application 140 has access to a large amount of raw data from which to generate a security code. Further, since display parameter values, such as color values, typically exhibit a high degree of variation across an image, security codes generated based on these values have a high degree of entropy.

Finally, at step S310, the computing device generates a security code based on the defined set of locations. The generation of the security code is described in greater detail below. The security code may be used by the security application 140 to generate an encryption key, or may used directly as an encryption key.

The steps described above in relation to FIG. 3 are used in both a registration process and an access process. The registration process is used to initially register the user as an authorized user of the system i.e. setting up an encryption key for the user to access encrypted data.

During the registration process, the user selects an image. The image could be, for example, selected from a gallery of images presented on the display 116 by the security application 140. The images could be well-known photographs or paintings, brand images, or other graphics provided by an administrator. This would avoid the need for the user to provide an image, and would make the registration process user friendly. Alternatively, the image could be selected by the user from images stored in the non-volatile storage 106 of the device 100, such as photographs that the user has taken, or if the computing device 100 is equipped with a camera, the security application 140 could prompt the user to take a photograph using the camera at this point. This enables the variation in potential images to be very large and minimizes the chance of an unauthorized user being able to replicate the password (since he would not have access to the correct image). As described in relation to the steps shown in FIG. 3, the user then enters user inputs to define the user inputs that will be required for access to be authorized during the access process.

As is common with alphanumeric passwords, the security application 140 may require that the user repeats entry of the user input during the registration process in order to confirm that the password has been entered correctly i.e. that the user did not inadvertently mis-enter his or her password. This prevents subsequent disruption to the user, who will be unable to access encrypted data if they have inadvertently mis-entered their password during registration.

Where the image is supplied by the user, then the security application 140 may assess the suitability of the image as a source of data for generating a suitable security code or encryption key as part of the registration process. For generation of secure encryption keys, it is necessary to have an image that is complex enough that a would-be attacker could not easily guess the traced pattern. The display parameters that define the image must therefore contain enough variation to provide the required level of entropy.

In order to support image complexity requirements it is desirable to have one or more measurements of complexity. In some embodiments, a measure of image complexity based on the display parameters characterizing the image is generated when user input is received to select the image (step S300) in the registration process. If the measure of complexity of the selected image falls below a threshold value (which may be defined by an administrator for example), the image could be rejected immediately as being too simple, and an error message displayed. The user might then be prompted to supply a different image, or defer completing the registration process until a later time. Images not meeting the complexity criteria would be rejected, at the point of selection, and the user would be required to select another image i.e. the user is not permitted to generate an encryption key based on user inputs overlying an image that does not meet the complexity requirement. This ensures that encrypted data is secure by ensuring that security codes that are generated using data from within the image contain at least a predefined level of entropy. Furthermore, since the complexity value relates to the variation in the display parameters characterizing the image, users are only permitted to select images containing a high number of recognizable features; this minimizes the chance of an unauthorized user guessing the correct set of user inputs (by, for example, selecting the few obvious features presented in an image not meeting the complexity requirement).

The measure of complexity may include a measure of variation of color values in the selected image. Images in which the measured variation in color values does not meet a determined threshold value would be rejected as not meeting the complexity requirement and the user would not be permitted to complete the registration process. This provides a simple but effective way of determining which images are suitable sources of data for generating a security code.

The measure the variation of color values in a selected image may be based on an analysis of the distribution of the color values of its pixels. The analysis may be performed by calculating an average color value (ACV) of pixels in the image involving reading and summing each of the pixel color values in the image and dividing the summed value by the number of pixels within the image. The color value of each of the pixels within the image is compared with the ACV and a difference between the pixel color value and the ACV is determined for each pixel. This difference is compared with a threshold value (which may be chosen by, for example, the administrator) to determine whether the difference is within a threshold value of the ACV. A determination of the complexity of the image is made on the basis of the comparison with the threshold value. For example, if all, or a high proportion (compared with a threshold value) of the pixels differ from the ACV by an amount lying within the threshold amount, then the image would be considered too simple. A simple statistical measure could be implemented with minimum computational burden on the computing device 100; however, other statistical methods of analyzing the image could be employed. For example, a Standard Deviation in the pixel color values or other more advanced statistical metrics could be measured and a determination of the image complexity made on the basis of these measurements.

In embodiments where the one or more images are selected from a gallery of images, the administrator may be responsible for assembling or updating the gallery, and would therefore have to supply a different image at the point of addition to the gallery, if a selected image did not satisfy the complexity requirement. This obviates the need for the user to provide an image with the required degree of complexity. Accordingly, the burden of providing suitable images is placed on the administrator rather than the user, which makes the registration process simpler for the user.

During the access process, the user selects the same image that was selected during the registration process and enters the inputs as they were entered during the registration process. The access process may be used whenever an alphanumeric security password would normally be used. For example, the user may be required to enter user inputs (the graphical password) to unlock an application or to unlock the device, when the device is first turned on or following a period of inactivity.

The security application 140 may prompt the user to re-enter the user input entered during the registration process. Entering the same user input that was entered during the registration process causes generation of the same security code, and therefore enables encrypted data to be decrypted and read. Failure to enter the same user inputs that were entered during the registration process causes a different security code to be generated, thereby preventing encrypted data from being decrypted.

The user may be presented with their selected image at the point where they are required to enter their graphical password user input. Alternatively, the security application 140 may present a gallery of images from which the user must select the correct image in addition to entering the correct user input. Requiring the user to select the correct image from a gallery of images provides an additional layer of security. In any case, during the access process the image is displayed on the screen and the user is required to reproduce the user input defined during the registration process over the image in order for the security application 140 to authenticate the user.

In some embodiments, the computing device 100 (or the security application 140 stored thereon) is arranged to recognize when an incorrect security code has been generated (for example, by recognizing that the data has not been decrypted correctly) and informs the user that access is denied. In some embodiments, the security application 140 may perform a security action in the event that it detects that a predefined number of incorrect security codes have been generated. For example, following a predefined number of unsuccessful attempts at entering a graphical password, the security application 140 may perform one or more of disabling the computing device 100, deleting encrypted data, and transmitting an alert message to an administrator. This minimizes the risk of an unauthorized user eventually accessing data by simply trying many combinations of user input, and so improves the security of the data.

Figure 4:
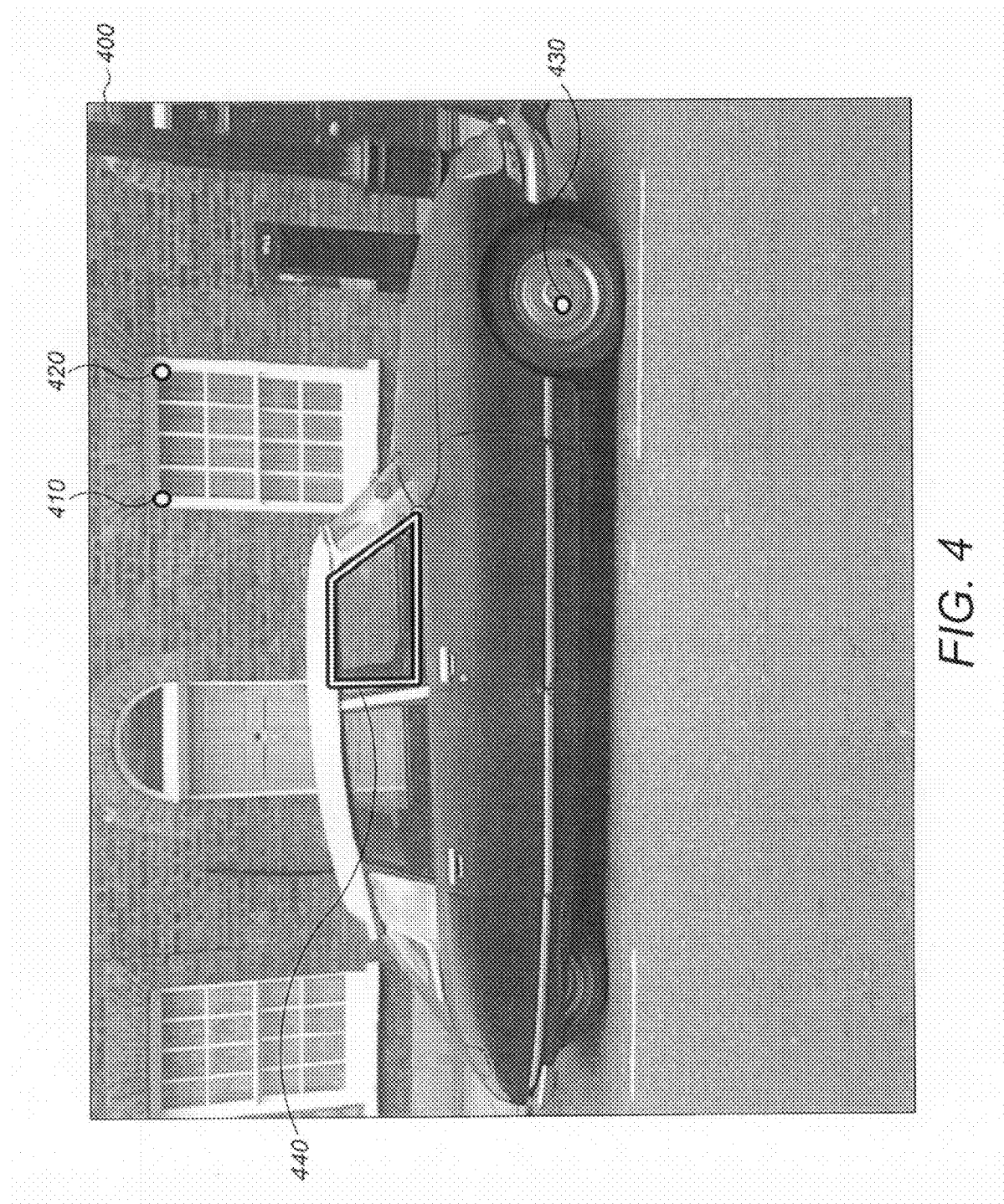
FIG. 4 is an exemplary image that may be used in generating a security code in accordance with a first embodiment.

FIG. 4 shows an image 400 representing a photograph that may be displayed by the security application 140 and presented to the user at the point of prompting the user to enter user input corresponding to a graphical password. Although the image depicted is a grayscale image, it will be understood that in practice photographs will typically contain a large variation in color. A photograph showing an arrangement of the objects such as is depicted in FIG. 4 contains a range of features that form recognizable "landmarks" to the user, and which the user can use as a frame of reference for entering user inputs. This enables the user to remember passwords more easily and to enter the correct password more easily.

FIG. 4 also shows an exemplary user input pattern that the user has entered over the displayed image to select points within the image. These include three individual points 410, 420, 430, defined by selecting non-adjacent imaging elements, and four straight lines which form a four sided polygon 440, which defines the perimeter of an area. The straight lines, and therefore the polygon 440, are formed by selecting a continuous sequence of mutually adjacent individual elements.

In some embodiments, an individual location may be defined by selection of a number of clustered imaging elements. For example, the security application 140 may determine that although the computing device received user input selecting multiple imaging elements, the user inputs were received simultaneously, or quasi-simultaneously, and on this basis determine that the user intended to select a single point. In some embodiments, where the cluster encompasses fewer locations than a threshold value the security application 140 determines that the user input received to select the cluster of point corresponds with selection of just a single point. This reduces the accuracy with which the user is required to enter user inputs, facilitating user input.

As described above, the user inputs may be entered using a pointing device, or by touch-screen input to the touch-screen display 116a. User input to enter the points may be performed by tapping the screen or by clicking a pointing device cursor at a given location in the image, and user input to enter the lines may be performed by tracing a line on a touch-screen, or by clicking and dragging a pointing device cursor, along the path of the line in the image. The operating system 118 or the user input interface 110 may provide information to the security application 140 about whether received user input constitutes a continuous movement (i.e. a continuous stroke, or drag input), or a series of discreet taps or clicks by analyzing the user input as described below in relation to 11.

Although the pattern that the user has generated is shown overlaying the image in FIG. 4, in some embodiments the security application 140 may not display the pattern, thus reducing the risk of "shoulder-surfing" attacks, in which a potential unauthorized user observes an authorized user entering a password, in order to replicate the password at a later time.

During the registration process, the user will have defined a set of user inputs such as those depicted in FIG. 4, which form a pattern that is known only to the user, and which the user can reproduce during the access process. The pattern of user inputs essentially describes the set of locations within the image that will form the basis of the user's password or security code as described in greater detail below.

Based on the user input entered by the user, during registration and access processes, the security application 140 defines a set of locations on the basis of the locations within the image selected by the user input. In some embodiments, the defined set of locations is stored in volatile RAM storage 108. The security application 140 uses the defined set of locations as a basis for generating a security code as described in greater detail below.

It is desirable for the displayed image to have relatively high resolution, in order to increase the number of features in the image that might be used by the user as landmarks for user input, and therefore make it difficult to guess the correct user input. However, typically the precision of the user input means and the level of accuracy that users can enter the user inputs means that if entry of the user inputs required selection of individual pixels or imaging elements, there would be an unacceptably high instance of legitimate users inadvertently entering incorrect user inputs. Therefore, in order to maintain the degree of complexity of the displayed image but reduce the sensitivity of the security application 140 to minor input error, the security application 140 may define an array of discrete selectable locations with each location corresponding to an area of the displayed image and including multiple pixels or imaging elements. This reduces the sensitivity of the system to random, minor differences in user inputs entered by legitimate users, and so improves user experience.

Figure 5:
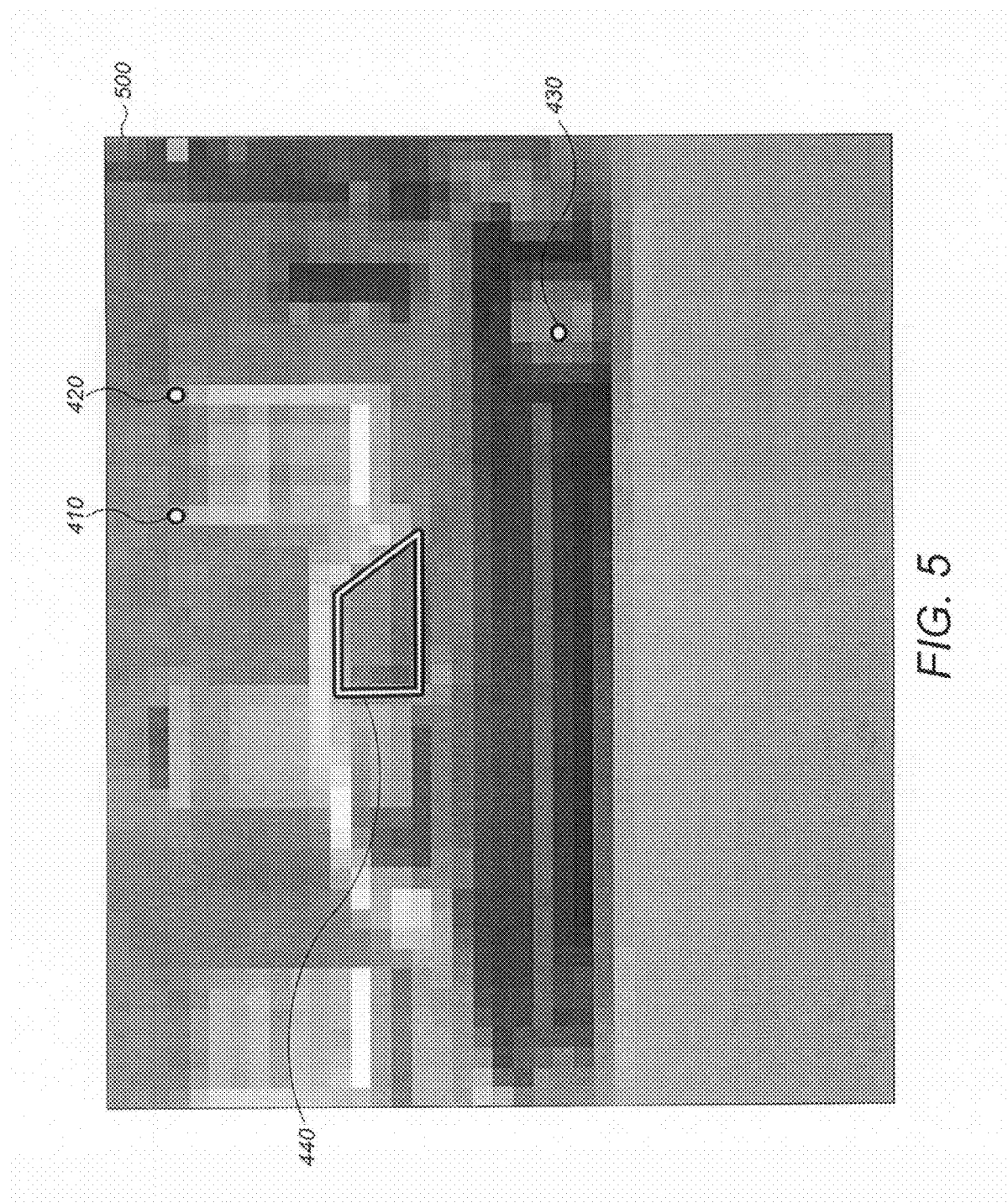
FIG. 5 is a diagrammatic representation of an image as presented to a computer device in accordance with the first embodiment.

FIG. 5 show one embodiment in which the relatively higher resolution displayed image 400 is divided into a relatively lower resolution array 500 or grid of selectable elements. The relatively lower array 500 of selectable elements is not visible to the user but the security application 140 uses this array 500 of elements when defining the set of locations. By displaying the relatively higher resolution image 400, rather than the relatively lower resolution array 500, the number of possible locations available to an unauthorized user appears to be much greater, making it more difficult for the unauthorized user to guess which features in the image to select.

In some embodiments, the location associated with a user input may be defined as that of the element of the lower resolution array 500 in which the user input is received, regardless of where in the lower resolution element the user input is received. In other embodiments, the user input may be associated with the element whose corner, edge, centre, or other predefined geometric feature is closest to the user input. In circumstances where user input is received in relation to more than one element (for example, if the user input is received at a boundary between elements of the array 500), the security application 140 may determine that each of the elements in which user input is received are selected. Alternatively, the security application 140 may determine that only one of the elements is selected by, for example, determining that the element in which received user input covering the largest area is selected. In some embodiments, the user, or an administrator may be able to vary the resolution of the lower resolution array 500, to vary the accuracy required to enter user inputs and therefore vary both the level of available entropy, and the security of the graphical password. This enables an administrator, or the user, to apply different levels of security to data with different levels of sensitivity i.e. highly confidential information can be protected with more robust passwords that are more sensitive to input error, and non-confidential data can be protected by less robust passwords that are easier to enter.

In some embodiments, display parameters, such as the pixel color value, associated with a user input for selecting one or more locations in the image may also be defined for the relatively lower resolution array 500 of selectable elements. The defined values associated with each location in the image may be stored in the non-volatile storage 106 during the registration process, or may be determined upon receiving user input. The value of the display parameters associated with a particular set of locations may be determined by, for example, taking an average of the display parameters of each of the imaging elements that make up the selectable element of the relatively lower resolution array 500, or the respective display parameter may be the display parameter of one of the imaging elements that make up the selectable element of the relatively lower resolution array; for example, the imaging element at a central location.

In one embodiment, the security code is generated based only on the actual points in the image 400 or array 500 that are defined by the user input. An exemplary method for generating a security code, which may subsequently be used to generate an encryption key, is shown in the flow diagram of FIG. 6.

At step S600, the coordinates of a selected point in the image is stored in volatile RAM storage 108. The stored coordinates could be the coordinates of a selected imaging element of the display 116 (particularly in embodiments where the image fills the display screen), or the coordinates of the pixel as defined in the image file. The location may be represented as Cartesian coordinates or by some other coordinate system, for example, by a polar coordinate system. In some embodiments, the security application may apply a mathematical transformation to the coordinates before they are stored.

Other means of identifying the location of a pixel (or group of pixels) could be used; for example, an indexing system, in which the display parameters of pixels are listed in order, may be used. The selected location may relate to a pixel associated with the displayed image 400, or to an element of the relatively lower resolution array 500.

In embodiments where the image is selected by the user during the registration process, the security application 140 may compress the selected image using a compression algorithm, and store the compressed image in the non-volatile storage 106 in compressed form. In embodiments where the image is provided by an administrator, compression of the image may be performed at the point that the image is added to the gallery, but it may still be stored in the non-volatile storage 106 in compressed form.

In order for the security application to define a set of locations (step S306) and determine values of display parameters associated with the defined set of locations (step S308), the security application 140 may decompress the image file to access the coordinate and display parameter values, when generating a security code (step S310).

At step S602, a value of one or more display parameters associated with the location of the selected location (determined at step S308) is stored in volatile RAM storage 108. As described above the values may be RGB values of a corresponding image pixel, or some other display parameter, and could relate to a pixel associated with the displayed image 400, or to an element of the relatively lower resolution array 500. In some embodiments, the security application 140 may also store data relating to the timing of received user inputs in RAM 108. The timing of the inputs may be determined by determining a time between successively received user inputs, which may be stored as the number of seconds between received user inputs, for example. The timings could relate to user inputs received to select points in a single image, in multiple sequentially displayed images, or in a video sequence. Including timing data provides more raw data from which the security application 140 can generate a security code, and therefore increases the security of the encrypted data.

At step S604, the security application 140 determines whether there are any more locations determined by the received user input, that have not yet been stored. If there are, steps S600 and S602 are repeated; otherwise, the security application moves to step S606.

At step S606, the stored location and display parameter values for each location in the defined set of locations based on received user input are concatenated to form a string of values that forms the security code. In some embodiments the concatenation may be done concurrently with the storing of the coordinate and display parameter values. In some embodiments, the concatenated string could be generated without including the co-ordinate values; for example, the security application 140 may only concatenate the display parameters. In some embodiments, the concatenated string may also include timing data, or other data associated with the received user input.

At step S608 a security code is generated from the concatenated string (in accordance with step S310). The string may be used directly as the security code or may be transformed with, for example, a hash function. In some embodiments, the security application 140 may receive user input to indicate to the security application 140 that the user has completed entering their user input; for example, the user may select an "enter password" icon presented on the display 116. In some embodiments, the security application 140 may determine that the user has completed entering their user input if a predetermined time has elapsed without receiving further user input. This enables the security application 140 to generate a security code without further user input, making it easier for the user to enter their password.

Figure 6:
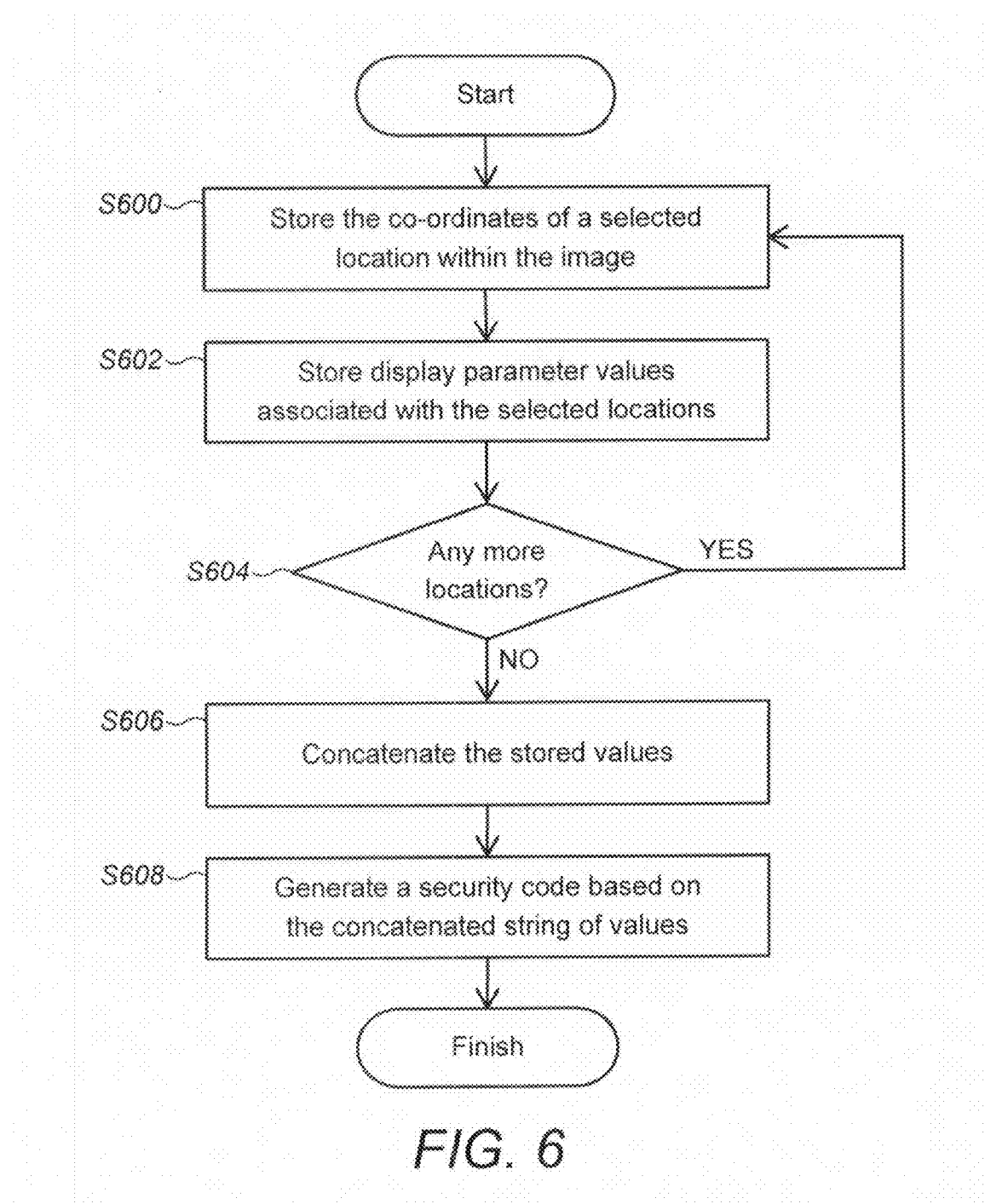
FIG. 6 is a flow diagram illustrating exemplary steps for generating a security code in accordance with the first embodiment.

FIG. 7 shows an exemplary method of the generating a security code according to the steps of FIG. 6. The table 108 represents values stored in RAM 108 based on received user input as represented in FIG. 5. In this example, the inputs are received in the following order. Firstly the user traces the polygon 440 with a vertical downward stroke, a horizontal rightward stroke, a diagonal stroke upward to the left, and a horizontal leftward stroke. The user then taps, in order, the three single points 410, 420, 430. The coordinate values and the RGB color values are saved to RAM 108 in the order they are received (steps S600 and S602). The values of the coordinates and the color values are then concatenated to generate the security code shown (step S606).

In some embodiments, rather than concatenating the location and display parameter values in the order that the corresponding user inputs were received, the order may be changed, reversed, or the defined set of locations may be sorted into the order they are displayed. For example, the locations may be sorted from left to right, and then top to bottom, or in order of their distance from the centre of the image, or from some other point in the image, and then by angular separation from a predefined axis such as an edge of the image or an arbitrary axis. Alternatively, for locations other than the first location in the set, the location of the previous point could be used as an origin, other than the absolute origin of the image, for determining a co-ordinate value.

The security code may be further obfuscated by omitting certain values from the concatenated string. For example, the concatenated string could be generated without including the co-ordinate values or display parameter values of every third location in the defined set. This provides added uncertainty for unauthorized users attempting to break the password, and so increases the security of the encrypted data.

Combinations of the above variations could be applied to provide even greater obfuscation of the security code, further reducing predictability of the user input sequence, and increasing the security of the encrypted data.

In some embodiments, the security application 140 may display a video or sequence of images. This provides a much greater amount of data with which the security application 140 can generate a security code, and provides a much greater range of possible user inputs from which an unauthorized user would need to guess to enter the correct sequence of user inputs in order to decrypt the data. The security application 140 may store (at steps S600 and S602) co-ordinates and display parameters based on user input received to select points displayed in the video or the sequence of images. The determined values of the display parameter associated with a given user input may be based on equivalent display parameters of a pixel of a corresponding still image.

Where a sequence of still images are displayed, the security application 140 may store the co-ordinates and display parameters associated with a received user input in RAM 108 before displaying the next image in the sequence. Alternatively, each of the sequence of images may be displayed within a given time interval and the user may be required to enter user interval in the correct time interval.

Where a video sequence is displayed, the security application 140 may define a series of discrete still images that are not visible to the user, but which the security application uses to define the location and display parameters. Each still image may correspond to a defined time interval, and the values associated with the display parameters for each location within the defined series of still images may be time averaged over that time interval. The security application 140 may then store location and display parameter values in RAM 108 in the manner described above in relation to a sequence of still images.

It may be desirable to generate a security code that is longer than can be generated using only the locations defined by actual user input. This is particularly true in applications where it is necessary or desirable to keep the user input simple, and it is undesirable to force the user to user complex user input in order to achieve the desired security code length.

Figure 8:
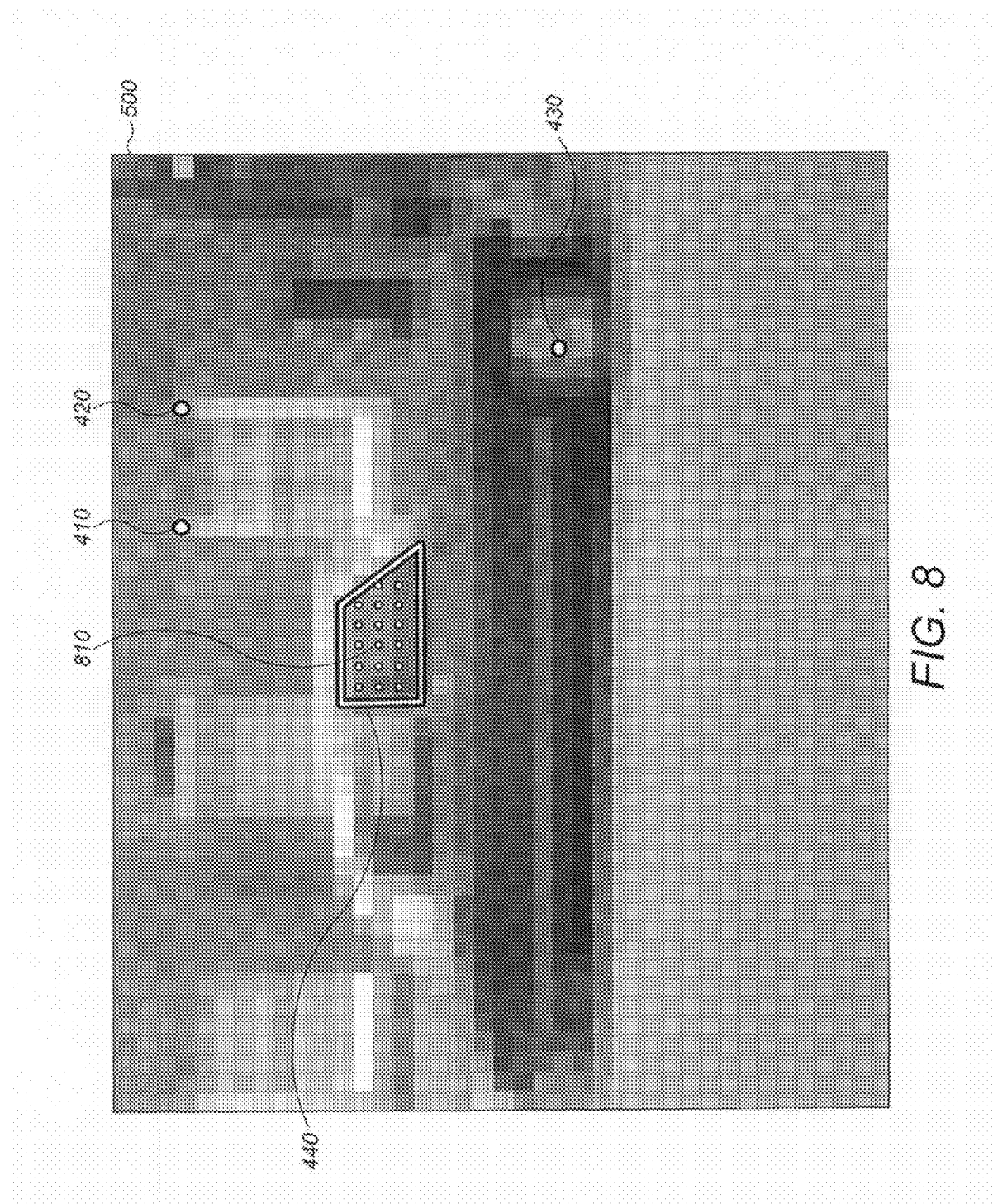
FIG. 8 is a diagram illustrating an exemplary set of received user inputs in accordance with a second embodiment.

FIG. 8 shows an embodiment in which portions of an image that are not directly covered by part of the selected pattern (i.e. the user has not selected imaging elements corresponding to those specific locations) are included when the security application 140 generates a security code as well as portions of the image that are directly covered (i.e. that the user has selected). In this embodiment, the user has selected a polygon 440 enclosing an area containing multiple elements 810 of the lower resolution array 500, and a portion of the security code is generated using these elements by performing steps S600 to S604 described above in relation to FIG. 6. Twenty five elements of the array 500 are directly covered by the received user input and a further seventeen elements are included by virtue of being enclosed by the polygon 540. The seventeen further elements are used to form a further portion of the security code by including the locations of these elements when performing steps S600 to S604. These points may be included in a predefined order; for example, from left to right then from top to bottom. The amount of raw data available to the security application 140 for generating a security code is therefore increased with respect to the embodiment illustrated by FIG. 5 (where only elements directly covered by the received user input are available), thereby increasing the entropy of the generated security code without increasing the complexity of the user input and the burden placed on the user in terms of remembering and/or entering a password.

The security application 140 may determine which elements of the lower resolution array 500 to include in the set of locations for generating the security code by employing an "insideness testing", or "point-in-polygon" algorithm for determining which elements are within the polygon 440. For example, the security application may employ a ray casting algorithm, a winding number algorithm, or both, applied to each of the elements of the lower resolution array 500. The security application 140 uses the locations and display parameter values associated with the elements determined to be within the polygon, in addition to those directly selected by the user input, to generate the security code as described in greater detail below. Again the coordinates and display parameter values are stored in the volatile RAM storage 108, and are concatenated to form the security code. However, since the number of included elements is increased compared to those determined by the steps of FIG. 6, and shown in FIG. 5, the amount of data used to generate the security code is larger. Therefore the security code has the advantage of increased complexity, since it is longer, without a corresponding increase in the complexity of the required user input.

Once the security application 140 has determined which elements of the lower resolution array 500 are enclosed by the polygon 440, the coordinates associated with the location of each of the elements are stored in the volatile RAM storage 108 (per step S600), where necessary using the map to transform the coordinates of the element as displayed on the display 116 to a pixel location within the image file. The display parameter (or parameters) associated with each element (i.e. as defined for the corresponding pixel or pixels in the image file) determined to be enclosed by the polygon 440 are then also stored in the volatile RAM storage 108 (per step S602). Steps corresponding with steps S600 and S602 are repeated for all elements of the lower resolution array 500 that are determined by the security application 140 to be within the polygon 440 until there are no more elements of the lower resolution array 500 covered or enclosed by the polygon 440 whose coordinates and display parameters must be stored. The coordinate and display parameter values associated with the enclosed elements may be stored in RAM 108 in order, for example, from left to right and then from top to bottom, or in any other order. The security application 140 then concatenates the values stored in the volatile RAM 106 (per step S606), and generates a security code on the basis of the concatenated string of values (per step S608).

In order to include elements of the array 500 enclosed by the polygon 540, the steps that the security application 140 performs may be augmented to include an analysis of the set of locations selected by the user to identify subsets of locations that define enclosed areas. For example, the analysis may include determining if the received user inputs defined one or more polygons. An exemplary analysis is described below.

The order in which the locations are used to generate the security code may be determined by the order in which the enclosed areas are determined, or, for example, from left to right and then top to bottom, or in any other order. As described above in relation to the steps of FIG. 6, variations in the order in which values are concatenated into a string, and omission of certain values of the string could be included in the augmented method. In addition, the coordinate values associated with the enclosed elements could be based on an origin different to the absolute origin of the image, such as, for example, the first or last point in the enclosing part of the pattern, or on the centre of the enclosed area. Each of these variations enables generation of security codes with improved entropy, without any increase in the complexity of the user input.

Figure 9:
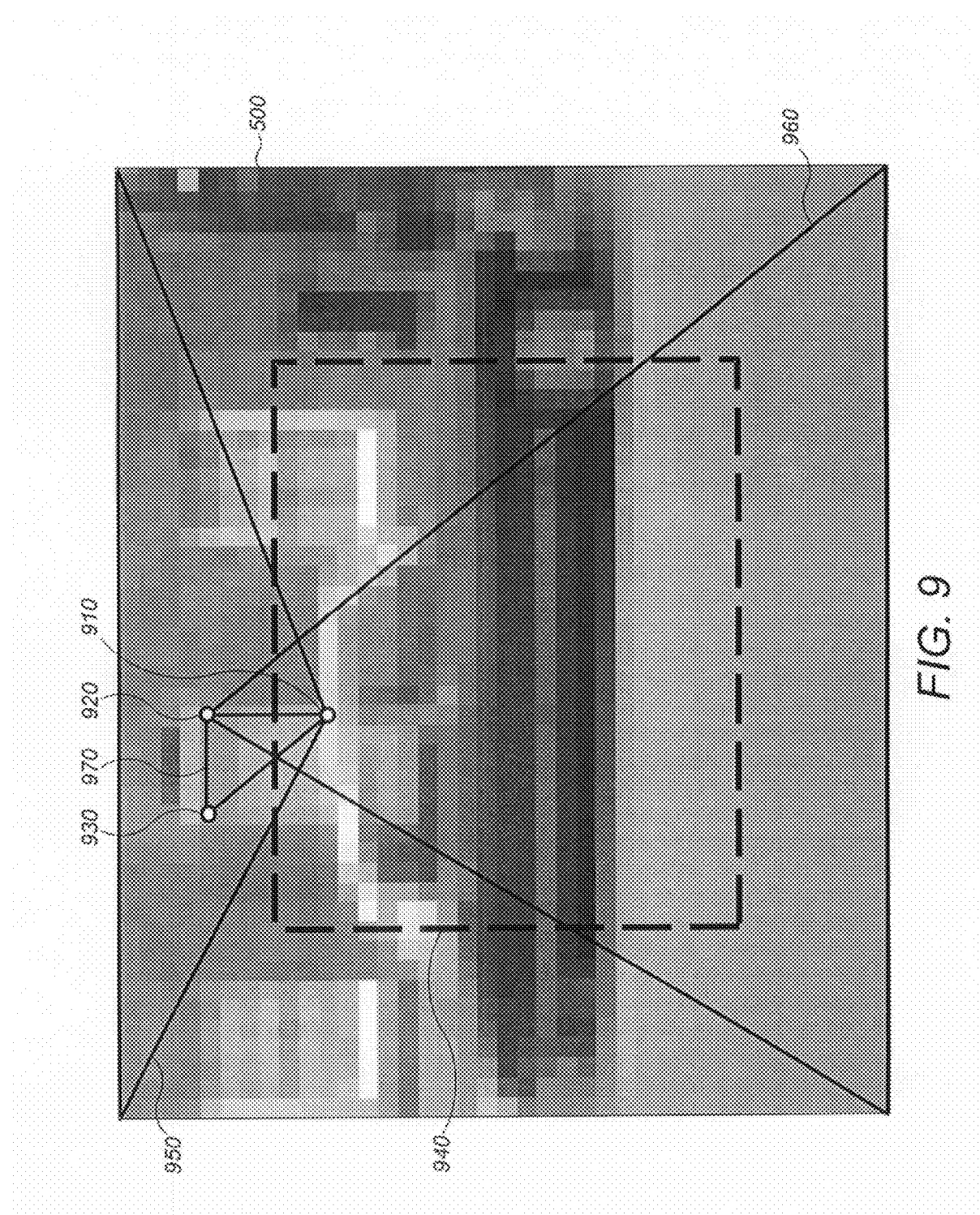
FIG. 9 is a diagram illustrating an exemplary set of received user inputs in accordance with a third embodiment.

FIG. 9 shows an exemplary case in which the user input comprises only three discrete points in the image 910, 920, 930 selected in that order. The user-selected locations are used in conjunction with predefined locations in the image to define artificially enclosed areas (triangles in this example), and thus further increase the length and complexity of the security code, without increasing the complexity of the received user input.

Figure 10:
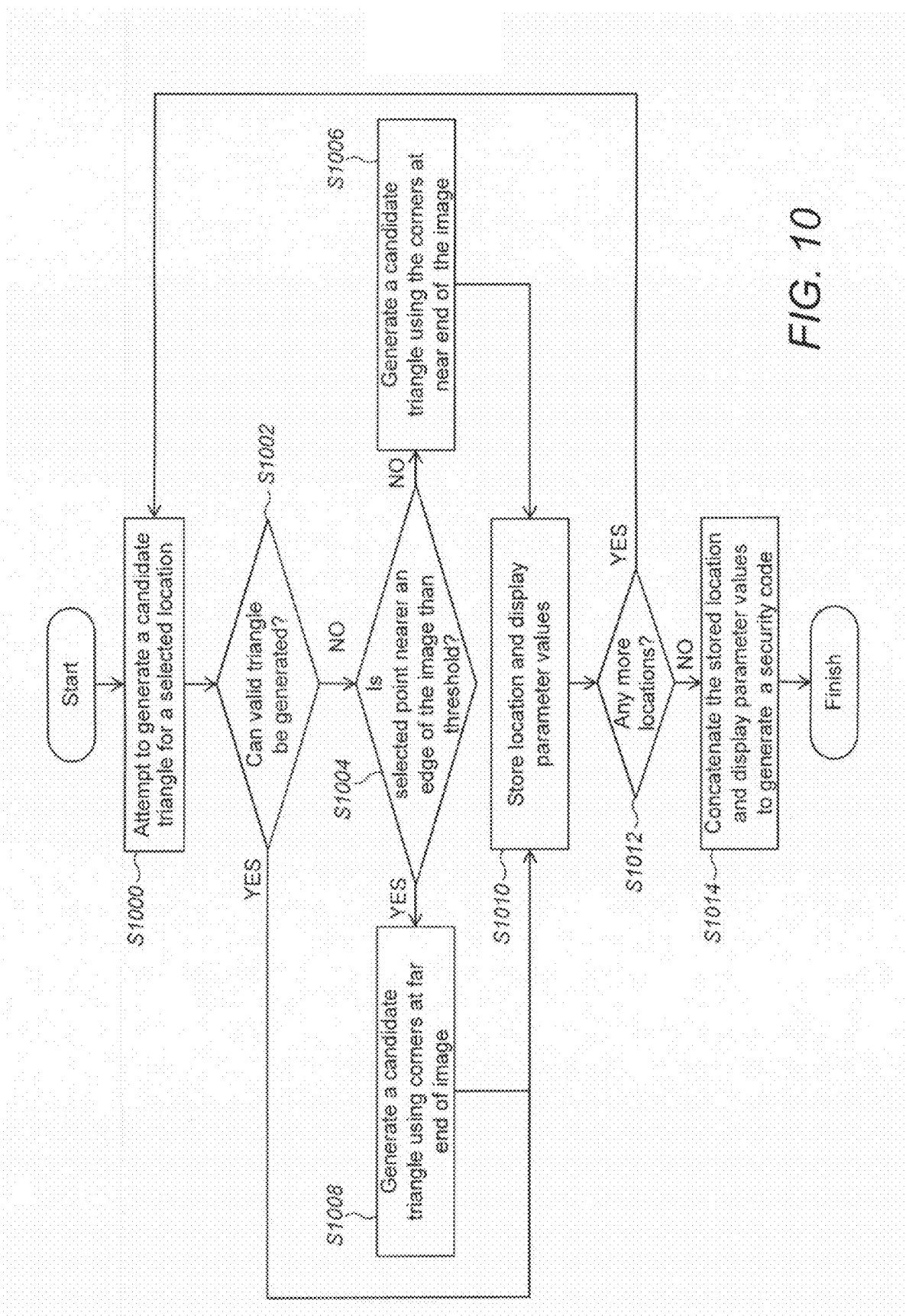
FIG. 10 is a flow diagram illustrating steps performed by a security application in generating a security code generated in accordance with the third embodiment.

FIG. 10 shows a flow diagram depicting exemplary steps that the security application 140 performs to generate the triangles.

At step S1000, the security application 140 selects a location from the set of user-selected locations and attempts to generate a candidate triangle using the selected location and the two preceding selected locations as vertices of the triangle.

At step S1002, the security application 140 determines whether a valid candidate triangle can be generated. For points 910 and 920 in FIG. 9, the security application 140 would not be able to generate a candidate triangle at all, as there are not two preceding selected locations. Where a candidate triangle can be generated, as is the case for point 930, the security application may determine whether the generated triangle is valid according to a minimum validity requirement. For example, for a triangle to be considered valid it may be required to enclose at least three elements of the array 500 in addition to the three points defined by the user input. If a valid candidate triangle can is generated, the process proceeds to step S1010, described below.

At step S1004, if no valid candidate triangle has been generated, the security application 140 determines a distance of the selected point from the nearest edge of the image, and determines whether the selected point is nearer to an edge of the image than a threshold separation (for example, within a certain number of pixels or elements of the relatively lower resolution array 500). For example, locations falling outside the box 940 in FIG. 9b might be considered nearer than the threshold distance from an edge.

If the selected location is determined not to be nearer than the threshold distance from an edge, the security application 140 generates, at step S1006, a candidate triangle using the selected location and the corners at either end of the nearest edge of the image as vertices. For example, point 910 in FIG. 9 might be determined to be further away than the threshold distance from an edge and so the triangle 950 is generated using the corners at either end of the nearest edge as vertices. The process then proceeds to step S1010 described below.

On the other hand, if the selected location is determined to be nearer than the threshold distance from the nearest edge, the security application 140 generates, at step S1008, a candidate triangle using the selected location and the corners at either end of the edge opposite the nearest edge of the image as vertices. For example, point 920 in FIG. 9 might be determined to be near an edge and so the triangle 960 is generated using the corners at either end of the edge opposite the nearest edge as vertices. By generating the candidate triangle using the corners at either end of the opposite edge if the selected location is near an edge, the generated candidate triangle is guaranteed to have at least a minimum size (dependent on the defined threshold distance). This facilitates the generation of security codes having a high amount of entropy. The process then proceeds to step S1010 described below.

Although, in steps S1006 and S1008, the corners of the image are used, it will be understood that other provided reference points could be used as the vertices of the triangle, such as points on the edge of the image. It will also be understood that geometric shapes other than triangles could be defined to increase the complexity of the generated security code. Further, whilst in the present example a rectangular image is used, it will be appreciated that the any other shape of image could be used.

At step S1010, the security application 140 stores, in the RAM storage 108, location and display parameters for each element of the array 500 covered or enclosed by the triangle generated at step S1002, S1006 or S1008. The security application 140 may interpolate between one or more elements of the array 500 and/or reference points (such as the corners of the image) to define lines of elements corresponding with the edges of the triangles 950, 960, 970. The security application 140 may then store the coordinates of each element of the interpolated line (per step S600), and may store one or more display parameters associated with each of the interpolated elements (per step S602), in the RAM 108. The security application 140 may then determine that the interpolated lines form one or more polygons (for example, triangles 950, 960, 970).

As described above in relation to the polygon 440 shown in FIG. 8, the security application 140 may determine which elements of a lower resolution array 500 are within a triangle 950, 960, 970 by employing an insideness testing, or point-in-polygon, algorithm applied to each of the elements of the lower resolution array 500 as described above in relation to FIG. 8. The elements of the array 500 enclosed by the interpolated lines may then be included in the set of locations as described below.

Once the security application 140 has determined which elements of the lower resolution array 500 are enclosed by a triangle 950, 960, 970, the coordinates associated with the location of each of the elements is stored in the volatile RAM storage 108 (per step S600), where necessary using the map to transform the coordinates of the element as displayed on the display 116 to a pixel location within the image file. The display parameter (or parameters) associated with each element (i.e. as defined for the corresponding pixel or pixels in the image file) determined to be enclosed by a triangle 950, 960, 970 are then also stored in the volatile RAM storage 108 (per step S602). Steps corresponding with steps S600 and S602 are repeated for all elements of the lower resolution array 500 that are determined by the security application 140 to be within a triangle 950, 960, 970 until there are no more elements of the lower resolution array 500 covered or enclosed by a triangle 950, 960, 970 whose coordinates and display parameters must be stored. The coordinate and display parameter values associated with the enclosed elements may be stored to RAM 108 in order, from left to right and then from top to bottom, or in any other order. The security application 140 then concatenates the values stored in the volatile RAM 106 (per step S606), and generates a security code on the basis of the concatenated string of values (per step S608). In this way the generated security code includes data from the enclosed elements.

At step S1012, the security application 140 determines whether there are any more locations defined by the received user input, for which candidate triangles have not yet been generated. If there are, steps S1000 to S1010 are repeated; otherwise, the security application moves to step S1014.

At step S1014, the security application 140 generates a security code by concatenating the values stored in the RAM 108, as described above with respect to other embodiments. The triangles 950, 960, 970 cover a much greater portion of the image than would be covered if the security code were generated based on the user input alone. Therefore, the security application 140 can generate a security code having a higher degree of entropy without any increase in the complexity of the user input, and therefore no additional burden on the user.

As shown in FIG. 9, triangles generated by this method may overlap, which means the color values of some pixels may be included twice, further increasing the potential length of the security code and accordingly its entropy.

In a further example, the security application 140 interpolates individually selected locations to define lines, which in turn form a polygon enclosing an area.

Although the user inputs depicted in FIG. 9 correspond to single elements of the lower resolution array 500, it will be understood that corresponding methods could be applied to patterns containing lines. For example, the security application 140 could interpolate between the start and end points of each line to generate an enclosed polygon.

As described above, the security code generated according to any of the above methods may be used to generate a key for decrypting data stored in encrypted form. The encrypted data to which the security code provides access may be stored in the non-volatile storage 106 of the computing device 100, or it may be stored remotely, at an enterprise server 216, for example. The security code may alternatively or additionally be used as, or used to generate, a password to unlock a local or remote software application, or for other purposes relating to data security.

The security application 140 may impose constraints on the complexity of the generated security code (e.g. the number of bits that the security code includes) to ensure that encrypted data cannot be decrypted by an unauthorized user attempting to decrypt the data using randomly or systematically chosen keys (in what is commonly referred to as a brute force attack). For example, in the AES 192 bit standard, encryption keys having 192 bits are used; i.e. there are $2^{192}$ possible keys.

In some embodiments, the administrator sets a password complexity requirement at the point of registration, and a user must enter a graphical password that generates a security code meeting the complexity requirements, or be denied access to the system. Password complexity requirements are also intended to make it more difficult for users' passwords to be guessed or observed in so-called "shoulder-surfing" attacks. In order to assess whether a given password satisfies the complexity requirement, in some embodiments the security application 140 determines one or more measures of user input complexity during the registration process. For example, the security application 140 may measure the length of the security code and compare that length with a predetermined value; security codes that are shorter than the predetermined value will not satisfy the user input complexity requirement. Where this occurs, users may be prompted to enter a more complex password. This maintains a minimum level of security of the encrypted data.

In some embodiments, the user inputs are decomposed into discrete points, lines, and polygons and a complexity requirement is set for each type of user input element. In some embodiments, the user inputs may be further decomposed to differentiate, for example, between straight and curved lines. This provides the security application 140 with a greater degree of flexibility in generating an analyzing user inputs, and enables users to define more complex patterns as their passwords. Decomposition of the user input pattern is described in greater detail below.

In an exemplary arrangement, the administrative user sets the minimum complexity requirement to be:
3 Points;
1 Straight Line;
0 Non-straight Lines; and
0 Polygons.

For this exemplary user input complexity requirement, the password depicted in FIG. 9 would not meet the minimum complexity requirement, since although the pattern contains three points, there are no lines (straight or not), and therefore no polygons. However, the password depicted in FIGS. 4, 5 and 8 would satisfy the minimum complexity criteria.

The user input complexity requirements may be more flexible, in that there are a number of alternative requirement sets. For example, the administrative user may specify that the security application 140 requires either:

5 Points,
0 Straight Line,
0 Non-straight Lines; and
0 Polygons.

or:

0 Points;
0 Straight Lines;
0 Non-straight Lines; and
1 Polygon.

Multiple alternative complexity requirements provide more flexibility, and are therefore more user friendly, while maintaining a minimum degree of security of the encrypted data.

The administrative user may define a tariff-based complexity requirement, in which each type of element is assigned a complexity score, and a minimum score is specified. A user input pattern meets the minimum complexity requirement if the sum of the complexity scores for each of the elements in the user input meets or exceeds the minimum score. For example, the administrative user may set the minimum score to be 10 and assign the following tariff scores to each type of element:

Points=1;
Straight Lines score=2;
Non-straight Lines score=2; and
Polygons score=+5 (in addition to its constituent lines' scores).

For this exemplary user input complexity requirement, the user input pattern depicted in FIG. 9 would not meet the minimum complexity requirement, since the pattern only scores 3 according to the exemplary tariff, whereas, the user input pattern depicted in FIGS. 4, 5 and 8 would satisfy the minimum complexity criteria, since this pattern scores 16. A tariff-based complexity requirement provides more flexibility, and therefore is more user friendly, but maintains a minimum degree of security of the encrypted data.

The security application 140 may display a complexity meter to convey the measure of complexity of the user inputs received during the registration process to the user, in order to simplify and speed up the registration process. This would improve the ease with which users can set their passwords because users would know before submitting their chosen user input pattern whether the pattern meets the minimum complexity requirement; if the user would otherwise attempt to set a user input pattern that is insufficiently complex, they are made aware of the problem in a way that clearly guides them to entering a more robust password.

Furthermore, the complexity meter would also give the user an indication of how far their chosen pattern of user inputs exceeds the minimum complexity requirements to give the user and indication of how secure their password is. In some embodiments, the complexity meter may display textual information conveying the security of a user's chosen password; for example, the complexity meter may display, "weak", "moderate", "strong", or "very strong", depending on the measured complexity of the user input pattern, to give the user a clear indication of how secure their password is.

The decomposition into points, lines and polygons might be wholly provided by the computing device 100, or the security application 140 may contain the functionality for analyzing and assessing the complexity.

Figure 11:
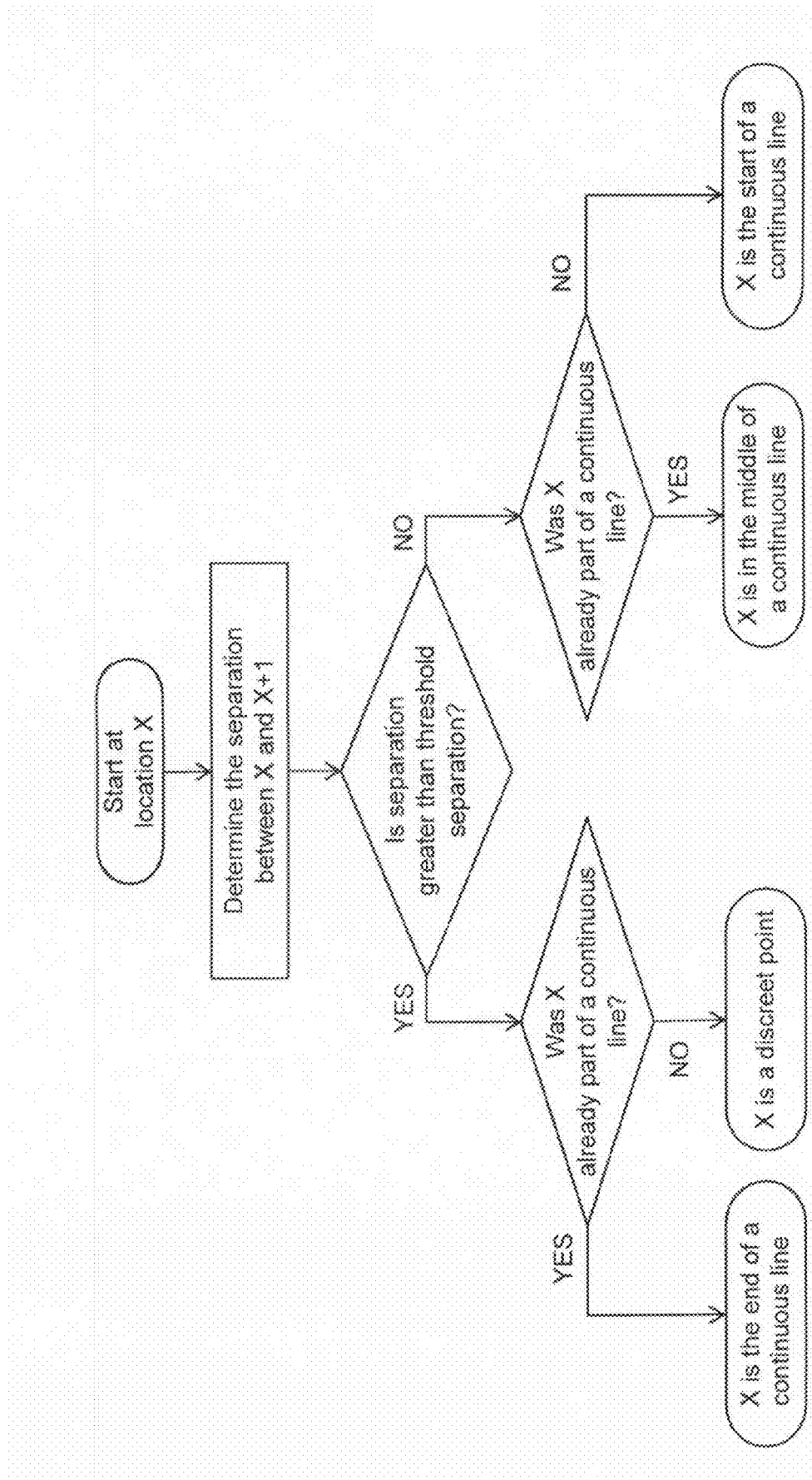
FIG. 11 is a flow diagram illustrating steps performed by a security application in generating a security code in accordance with a fourth embodiment.

FIG. 11 depicts an exemplary logic process for determining whether locations in a defined set of locations were input as discrete points (tapped), or were input as a continuous line. In this particular embodiment, the co-ordinates of points corresponding to user input received by the device are supplied to the security application 140 in a sequence corresponding to the sequence in which they were entered by the user.

In this exemplary embodiment, the locations defined by the user input are stored in RAM 108 in the sequence the user inputs are received. For each location, X, in the defined set of locations, which may be a sequence ordered, for example, in the order that the user inputs were received, the security application 140 determines a separation, d, between the coordinates of X and the coordinates of the next location, X+1. If d is less than a specified threshold value, $S_1$, X and X+1 are considered to be part of a continuous line. $S_1$ is therefore the maximum distance between two locations that can be considered to be part of a single user input and hence on the same line, if adjacent.

The analysis is then repeated for point X+1 in relation to point X+2 and so on until all points are analyzed.

The threshold separation, S1, may be determined based on the sensitivity of the user input device (e.g. the resolution of the input function of a touch-screen display 216), or on the display resolution of the displayed image, and may be adjusted by the administrator, if necessary.

If the separation, d, between point X and point X+1 is less than $S_1$, and X was not already part of a continuously drawn or traced line, or sequence of user inputs, then point X is the start of a new continuous line.

If the separation, d, between point X and point X+1 is greater than $S_1$, and X was already part of a traced line, then point X is the end of a new continuous line.

If the separation, d, between point X and point X+1 is greater than $S_1$, and X was not already part of a continuous line, then point X is a discrete point.

Once the security application 140 has determined that a set of points corresponds to a continuous line, the line may be further categorized as either straight or non-straight, non-straight lines being either curved or including straight segments and bends or corners. Each set of points that the security application 140 has determined form a continuous line is analyzed to determine which locations are within a 'longest straight segment' of the line. This may, for example, be defined as the longest segment in which all points between the start and end points of the segment are separated from a theoretical straight line between the start and end points by less than a threshold value, $S_2$.

If the longest straight segment contains less than three locations, then the whole line is considered to be non-straight.

If the longest straight segment contains three or more locations, this segment is considered to be straight, and the analysis is repeated on the remaining portions of the continuous line.

If the previous longest straight segment starts at a point that is not the start of the continuous line, the analysis is repeated up to the point where the first longest straight segment begins.

If the previous longest straight segment ends at a point that is not the end of the original line, the analysis is repeated up to the point where the first longest straight segment ends.

The analysis is repeated until all portions of the line have been analyzed such that no remaining segments of the line satisfy the longest straight segment criteria.

The security application 140 may further analyze the set of points to determine whether locations in a defined set of locations, in particular a line, define a polygon. By recognizing that a line defines a polygon, the security application 140 can use points enclosed by the polygon in generating the security code, and can therefore increase the entropy of the generated code without a corresponding increase in the user input i.e. without increasing the burden on the user.

In an exemplary method, the security application 140 may determine that a line is a polygon if there are four different points on the line, points A, B, C, and D, where:

Point B is after point A on the line;
Point C is after point B on the line;
Point D is after point C on the line;
The distance between points A and D is less than a threshold $S_1$;
The distance between points A and B is more than S1;
The distance between points A and C is more than S1;
The distance between points D and B is more than S1;
The distance between points D and C is more than S1; and
The distance between points B and C is more than S1.

The criterion that the distance between point A and D is less than S1 ensures that the continuously drawn or traced line being evaluated is "closed" i.e. that the ends of the line meet at a common point. In some embodiments, determining that a continuously drawn or traced line forms a polygon or encloses an area may include evaluating each point in the line to determine whether it is less than S1 from all other points in the line; this enables the security application 140 to recognize enclosed areas within patterns where the drawn or traced line crosses itself, and the ends of the line do not necessarily meet.

The polygon consists of every point on the line from point A to point D, inclusive. As described above the areas defined by different polygons may overlap to provide even more variation in the data available for generating the security code, without any increase in the complexity of the user input.

The above embodiments are to be understood as illustrative examples. Further embodiments are envisaged. For example, the security application 140 could run independently of a client program 120 at the level of the operating system 118 and could be responsible for encrypting and decrypting all data stored in the non-volatile storage 106. Alternatively, the functions of the security application 140 could be performed within another application 130 on only part of the data handled by that application 130.

Although the embodiments described relate mainly to data received via the network interface 112, it will be understood that the security application 140 could be used to encrypt and/or decrypt only information that is native to the computing device; indeed in some embodiments, the computing device may have no means for connecting with any external device or network.

Although images described in relation to the above embodiments are two-dimensional photographs, it will be understood that where the display 116 permits the display of 3D images, the received user input may be for selecting locations within a displayed 3D image.

Furthermore, in embodiments that include a touch-screen display 116a, the security application 140 may determine a pressure applied to the touch-screen display 216 when receiving user input, and may use the determined pressure values to generate the security code.

Although the security application 140 is described above as being stored on non-volatile storage 106, it will be understood that it may be stored and run from any form of computer usable media. Computer usable media includes both computer storage media and communication media including any medium that facilitates transfer of a computer program from one place to another. A storage media may be any available media that can be accessed by a computer. By way of example, and not limitation, such computer usable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed be a computer. Also, any connection is properly termed a computer usable medium. For example, if the software is transmitted from a website, server or other remote source using a coaxial cable, fiber optic cable, twisted pair, digital subscriber line (DSL), or wireless technologies such as infrared, radio, and microwave, then the coaxial cable, fiber optical cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer usable medium may comprise non-transitory computer usable medium (e.g., tangible media). In addition, in some aspects computer usable medium may comprise transitory computer usable medium (e.g., a signal). Combinations of the above should also be included within the scope of computer usable media.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A method of generating a code for accessing data, the method comprising:

displaying an image on a display, the display comprising an array of display elements for displaying images, each display element having a predefined location on the display and being controllable according to an associated set of display parameters defining one or more display characteristics of the display element, whereby characteristics of a displayed image varied by varying values of the display parameters associated with the display elements;

defining a plurality of selectable image elements within the image, each selectable image element encompassing a plurality of the display elements;

receiving user input defining a plurality of selected image elements from the plurality of selectable image elements;

defining a perimeter of an area of the image based on the plurality of selected image elements and one or more reference points, wherein the one or more reference points are selectable image elements different from the plurality of selected image elements, the one or more reference points are located at an edge or a corner of the image, and the area includes a subset of the plurality of selectable image elements;

defining a set of display elements based on the perimeter of the area, the set of display elements including display elements enclosed by the perimeter of the area;

determining values of a plurality of display parameters, wherein the determined values comprise a concatenation of one or more values of one or more display parameters of each display element in the defined set of display elements, and the concatenation includes concatenating the one or more values into a string; and generating a security code based on the determined values.

2. The method according to claim 1, wherein the user input comprises selecting a continuous sequence of selectable image elements enclosing the area.

3. The method according to claim 1, wherein the user input comprises selecting a sequence of adjacent selectable image elements within the image.

4. The method according to claim 1, wherein the user input comprises selecting a plurality of non-adjacent selectable image elements within the image.

5. The method according to claim 4, further comprising: interpolating between the selected plurality of non-adjacent selectable image elements to define the set of display elements.

6. The method according to claim 1, wherein the image is represented in one or more image files, and the step of determining values of a plurality of display parameters comprises deriving the display parameters from the one or more image files.

7. The method according to claim 1, further comprising: deriving locations within the image based on the selected image elements.

8. The method according to claim 7, further comprising: transforming the selected image elements in accordance with a map linking the selected image elements on the display with locations within the image.

9. The method according to claim 1, wherein each selectable image element comprises a predefined array of discrete selectable locations, each selectable location being selectable according to user input corresponding to a predefined area of a displayed image, each predefined area including a plurality of the display elements.

10. The method according to claim 1, further comprising: receiving the image from the user.

11. The method according to claim 10, further comprising: determining a first complexity value of the image on the basis of the values of the plurality of display parameters associated with the defined set of display elements.

12. The method according to claim 11, wherein the first complexity value is determined based on a statistical variation of the plurality of display parameters.

13. The method according to claim 11, further comprising: requiring the user to provide a different image if the first complexity value of the image is below a first threshold complexity value.

14. The method according to claim 11, further comprising: determining a second complexity value on the basis of the received user input.

15. The method according to claim 14, further comprising: requiring the user to enter a different user input if the second complexity value is below a second threshold complexity value.

16. The method according to claim 10, wherein the image comprises a photograph.

17. The method according to claim 1, wherein the image is selected by the user from a gallery of images.

18. The method according to claim 1, further comprising: using the security code to generate an encryption key.

19. The method according to claim 18, further comprising: using the encryption key to decrypt and/or encrypt stored data.

20. The method according to claim 18, further comprising: using the encryption key to decrypt and/or encrypt data stored on a remote computing device.

21. The method according to claim 20, further comprising: displaying the decrypted data on the display.

22. The method according to claim 20, further comprising: displaying the decrypted data on a second display.

23. The method according to claim 1, further comprising:
using the security code to generate a first encryption key; and
using the first encryption key to encrypt and/or decrypt a second encryption key different from the first encryption key.

24. The method according to claim 23, further comprising: using the second encryption key to decrypt and/or encrypt stored data.

25. The method according to claim 1, wherein the determined values comprise color values associated with the defined set of display elements.

26. The method according to claim 25, wherein the color values comprise at least one of a red value, a green value and a blue value.

27. The method according to claim 25, wherein the color values comprise at least one of a hue value, an intensity value and a saturation value.

28. The method according to claim 25, wherein the color values comprise at least one of a cyan value, a magenta value, a yellow value and a black value.

29. The method according to claim 25, wherein the color values associated with the display elements are extracted from a color palette.

30. The method according to claim 1, further comprising: generating the security code at least partly on the basis of one or more coordinate values associated with the defined set display elements.

31. The method according to claim 1, further comprising: determining the security code at least partly on the basis of a timing of each user input.

32. The method according to claim 1, wherein the display comprises a touch-screen display and the user input comprises touch-screen user input.

33. The method according to claim 32, further comprising:
determining a pressure applied to the touch-screen display when receiving the touch-screen user input; and
generating the security code at least partly on the basis of the determined pressure.

34. The method according to claim 1, wherein the display comprises a 3D display, the image is a 3D image, and the method further comprises: receiving user input to select one or more locations within the 3D image.

35. The method according to claim 1, wherein generating a security code based on the determined values comprises:
changing an order in which values are in the concatenation of the one or more values of the one or more display parameters of each display element in the defined set of display elements; or omitting one or more values in the concatenation of the one or more values of the one or more display parameters of each display element in the defined set of display elements.

36. A computing device, comprising:
a storage comprising computer-executable software;
a user input device configured to receive user input;
a processor in data communication with the storage and the user input device and configured to execute the computer-executable software, process received user input, and cause the computing device to:
display an image on a display, the display comprising an array of display elements for displaying images, each display element having a predefined location on the display and being controllable according to an associated set of display parameters defining one or more display characteristics of the display element, whereby characteristics of a displayed image varied by varying values of the display parameters associated with the imaging elements;
define a plurality of selectable image elements within the image, each selectable image element encompassing a plurality of the display elements;
receive user input defining a plurality of selected image elements from the plurality of selectable image elements;
define a perimeter of an area of the image based on the plurality of selected image elements and one or more reference points, wherein the one or more reference points are selectable image elements different from the plurality of selected image elements, the one or more reference points are located at an edge or a corner of the image, and the area includes a subset of the plurality of selectable image elements;
define a set of display elements based on the perimeter of the area, the set of display elements including display elements enclosed by the perimeter of the area;
determine values of a plurality of display parameters, wherein the determined values comprise a concatenation of one or more values of one or more display parameters of each display element in the defined set of display elements, and the concatenation includes concatenating the one or more values into a string; and
generate a security code based on the determined values.

37. The computing device according to claim 36, wherein the computing device includes the display.

38. The computing device according to claim 36, wherein the display comprises a touch-screen display.

39. The computing device according to claim 36, wherein the computing device is a portable device.

40. The computing device according to claim 36, wherein the computing device is a smart phone.

41. A non-transitory computer readable medium having computer-executable instructions stored thereon which, when executed by a computing device will cause the computing device to:
display an image on a display, the display comprising an array of display elements for displaying images, each display element having a predefined location on the display and being controllable according to an associated set of display parameters defining one or more display characteristics of the display element, whereby characteristics of a displayed image varied by varying values of the display parameters associated with the imaging elements;
define a plurality of selectable image elements within the image, each selectable image element encompassing a plurality of the display elements;
receive user input defining a plurality of selected image elements from the plurality of selectable image elements;
define a perimeter of an area of the image based on the plurality of selected image elements and one or more reference points, wherein the one or more reference points are selectable image elements different from the plurality of selected image elements, the one or more reference points are located at an edge or a corner of the image, and the area includes a subset of the plurality of selectable image elements;
define a set of display elements based on the perimeter of the area, the set of display elements including display elements enclosed by the perimeter of the area;
determine values of a plurality of display parameters, wherein the determined values comprise a concatenation of one or more values of one or more display parameters of each display element in the defined set of display elements, and the concatenation includes concatenating the one or more values into a string; and
generate a security code based on the determined values.

42. A method of generating a code for accessing data, the method comprising:
displaying an image on a display, the display comprising an array of display elements for displaying images, each display element having a predefined location on the display and being controllable according to an associated set of display parameters defining one or more display characteristics of the display element, whereby characteristics of a displayed image varied by varying values of the display parameters associated with the display elements;
defining a plurality of selectable image elements within the image, each selectable image element encompassing a plurality of the display elements;
receiving user input to select one or more of the selectable image elements;
defining a perimeter of an area of the image based on the one or more selected image elements and one or more reference points, the area including the one or more selected image elements and the one or more reference points, and the area encompassing at least one given selectable image element different from the plurality of selected image elements;
defining a set of display elements based on the perimeter of the area, the set of display elements including display elements encompassed by the plurality of selected image elements and the at least one given selectable image element encompassed by the area;
determining values of a plurality of display parameters, wherein the determined values comprise a concatenation of one or more values of one or more display parameters of each display element in the defined set of display elements, and the concatenation includes concatenating the one or more values into a string; and
generating a security code based on the determined values.

* * * * *